United States Patent
Schwabe et al.

(10) Patent No.: US 7,107,581 B2
(45) Date of Patent: Sep. 12, 2006

(54) OVERFLOW PREDICTIVE ARITHMETIC INSTRUCTION OPTIMIZATION USING CHAINING

(75) Inventors: Judith Schwabe, Cleveland Heights, OH (US); Zhiqun Chen, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 423 days.

(21) Appl. No.: 10/712,919

(22) Filed: Nov. 12, 2003

(65) Prior Publication Data

US 2004/0073379 A1    Apr. 15, 2004

Related U.S. Application Data

(63) Continuation-in-part of application No. 10/686,513, filed on Oct. 14, 2003, which is a continuation of application No. 10/002,437, filed on Nov. 1, 2001, which is a continuation of application No. 09/439,113, filed on Nov. 12, 1999.

(51) Int. Cl.
*G06F 9/45* (2006.01)
(52) U.S. Cl. ...................... 717/136; 717/153
(58) Field of Classification Search ............ 717/136, 717/153
See application file for complete search history.

(56) References Cited

U.S. PATENT DOCUMENTS

| | | | |
|---|---|---|---|
| 3,805,045 A | 4/1974 | Larsen | |
| 3,993,891 A | 11/1976 | Beck et al. | |
| 4,400,769 A | 8/1983 | Kaneda et al. | |
| 4,504,924 A | 3/1985 | Cook et al. | |
| 5,107,451 A * | 4/1992 | Houk | 708/491 |
| 5,305,456 A | 4/1994 | Boitana | |
| 5,408,670 A | 4/1995 | Davies | |
| 5,446,901 A | 8/1995 | Owicki et al. | |
| 5,497,340 A | 3/1996 | Uramoto et al. | |
| 5,606,677 A | 2/1997 | Balmer et al. | |
| 5,668,999 A | 9/1997 | Gosling | |
| 5,724,279 A | 3/1998 | Benaloh et al. | |
| 5,732,263 A | 3/1998 | Havens et al. | |

(Continued)

FOREIGN PATENT DOCUMENTS

EP    0 778 522 A2    6/1997

(Continued)

OTHER PUBLICATIONS

Sun Microsystems, Inc., Java Card™ 20. Developer's Guide, Aug. 19, 1998, Revision 1.12.

(Continued)

*Primary Examiner*—John Chavis
(74) *Attorney, Agent, or Firm*—Gunnison, McKay & Hodgson, L.L.P.

(57) ABSTRACT

A method for arithmetic expression optimization includes receiving an operator and at least one operand of a first instruction defined for a first processor having a first base. The method also includes converting the first instruction to a second instruction optimized for a second processor having a second base smaller than the first base when overflow is impossible based at least in part on the operator and the relationship between the operand type and the second base. The method also includes converting instructions in an instruction chain to a wider base larger than the second base and smaller or equal to the first base when the at least one operand carries potential overflow beyond the second base and when the operator is sensitive to overflow. The chain is bounded by the second instruction and a third instruction that has been previously optimized and is the source of the potential overflow.

54 Claims, 30 Drawing Sheets

U.S. PATENT DOCUMENTS

| | | | |
|---|---|---|---|
| 5,740,441 | A | 4/1998 | Yellin et al. |
| 5,784,553 | A | 7/1998 | Kolawa et al. |
| 5,794,049 | A | 8/1998 | Lindholm |
| 5,884,316 | A | 3/1999 | Bernstein et al. |
| 5,920,720 | A | 7/1999 | Toutonghi et al. |
| 5,999,731 | A | 12/1999 | Yellin et al. |
| 6,003,038 | A | 12/1999 | Chen |
| 6,026,237 | A | 2/2000 | Berry et al. |
| 6,075,863 | A | 6/2000 | Krishnan et al. |
| 6,092,147 | A | 7/2000 | Levy et al. |
| 6,093,216 | A | 7/2000 | Adi-Tabatabai et al. |
| 6,151,618 | A | 11/2000 | Wahbe et al. ............... 718/1 |
| 6,182,158 | B1 | 1/2001 | Kougiouris et al. |
| 6,212,633 | B1 | 4/2001 | Levy et al. |
| 6,247,174 | B1 | 6/2001 | Santhanam et al. ......... 717/154 |
| 6,308,317 | B1 | 10/2001 | Wilkinson et al. |
| 6,363,523 | B1 | 3/2002 | Chen et al. ................. 717/153 |
| 6,477,702 | B1 | 11/2002 | Yellin et al. |
| 2002/0023954 | A1 | 2/2002 | Calder et al. ............... 235/381 |
| 2003/0028572 | A1* | 2/2003 | Hoskote et al. ............. 708/495 |

FOREIGN PATENT DOCUMENTS

| | | |
|---|---|---|
| WO | WO 01/14958 | 3/2001 |

OTHER PUBLICATIONS

Sun Microsystems, Inc., "Java Card™ 2.0 Application Programming Interfaces", Oct. 13, 1997, Rev. 1.0.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Rev. 1.0 Final.

Sun Microsystems, Inc., "Java Card™ 2.1 Application Programming Interface", Jun. 7, 1999, Final Rev. 1.1.

Sun Microsystems, Inc., "Java Card™ 2.1 Runtime Environment (JCRE) Specification", Jun. 7, 1999, Final Revision 1.1.

Sun Microsystems, Inc., "Java Card™ 2.1 Virtual Machine Specification", Jun. 7, 1999, Final Rev. 1.1.

Sun Microsystems, Inc., "Release Notes—Java Card™ 2.1 Specifications", Jun. 7, 1999, Final Rev. 1.1.

Sun Microsystems, Inc., "Java Check™ 3.0 Frequently Asked Questions", printed from http://java.sun.com/products/personaljava/jcheckfaq30-beta.html, on Dec. 3, 1999.

Sun Microsystems, Inc., "Java Check™ Technical Notice", printed from http://java.sun.com/products/personaljava/JcheckTechNotice.html, on Dec. 3, 1999.

Sun Microsystems, Inc., "Using Java Check™", Version 2.0.1, printed from www.sun.com/software/personaljava/techinfo.html, on Dec. 3, 1999.

Sun Microsystems, Inc., "Using Java Check™", Version 3.0, printed from http://java.sun.com/cgi-bin/download2.cgi, on Dec. 3, 1999.

Sun Microsystems, Inc., "The K Virtual Machine (KVM)", White Paper Jun. 8, 1999.

Ritchey, Tim, "Advanced Topics: The Java Virtual Machine" *JAVA!*, Chapter 14, pp. 25-346, Sep. 22, 1995.

Daniels, John et al., "Strategies For Sharing Objects In Distributed Systems", JOOP, Object Designers Ltd. UK, pp. 27-36.

Michael Shuttle et al., "Exact Rounding of Certain Elementary Functions", Jun. 29, 1993, pp. 138-145.

Ziv, Abraham, "Fast Evaluation of Elementary Mathematical Functions with Correctly Rounded Last Bit", Sep. 1, 1991, pp. 410-423.

George E. Necula et al., "Proof Carrying Code", Nov. 1996, pp. 1-60.

* cited by examiner

| Desktop Computer | Resource-Constrained Device |
|---|---|

```
short a = 0x7FFF;                          short a = 0x7FFF;
short b = 1;                               short b = 1;
short c = 1;                               short c = 1;

result = a [int-type add] b;               result = a [short-type add] b;
       = 0x00007FFF + 1                           = 0x7FFF + 1
       = 0x00008000                               = 0x8000
       = 32768                                    = -32768

FIG. 7A                                    FIG. 7B result = (short) a [int-type add] b;       result = (short) a [short-type add] b;
       = (short) (0x00007FFF + 1)                 = (short) (0x7FFF + 1)
       = (short) (0x00008000)                    = (short) (0x8000)
       = 0xFFFF8000
       = -32768                                   = -32768

FIG. 8A                                    FIG. 8B result = (short) (a [int-type add] b       result = (short) (a [short-type add] b
         [int-type add] c);                          [short-type add] c);
       = (short) (0x00007FFF + 1 + 1)             = (short) (0x7FFF + 1 + 1)
       = (short) (0x00008001)                     = (short) (0x8001)
       = 0xFFFF8001                               = -32767
       = -32767

FIG. 9A                                    FIG. 9B result = a [int-type add] b                result = a [short-type add] b
         [int-type divide] c;                       [short-type divide] c;
       = (0x00007FFF + 1) / 2                     = (0x7FFF + 1) / 2
       = 0x00008000 / 2                           = 0x8000 / 2
       = 0x00004000                               = 0xC000
       = 16384                                    = -16384

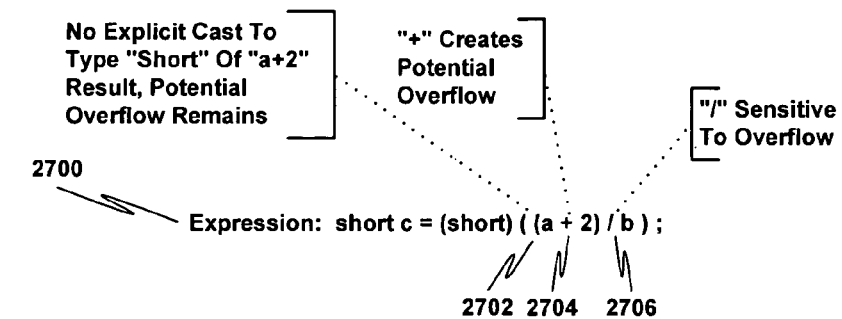
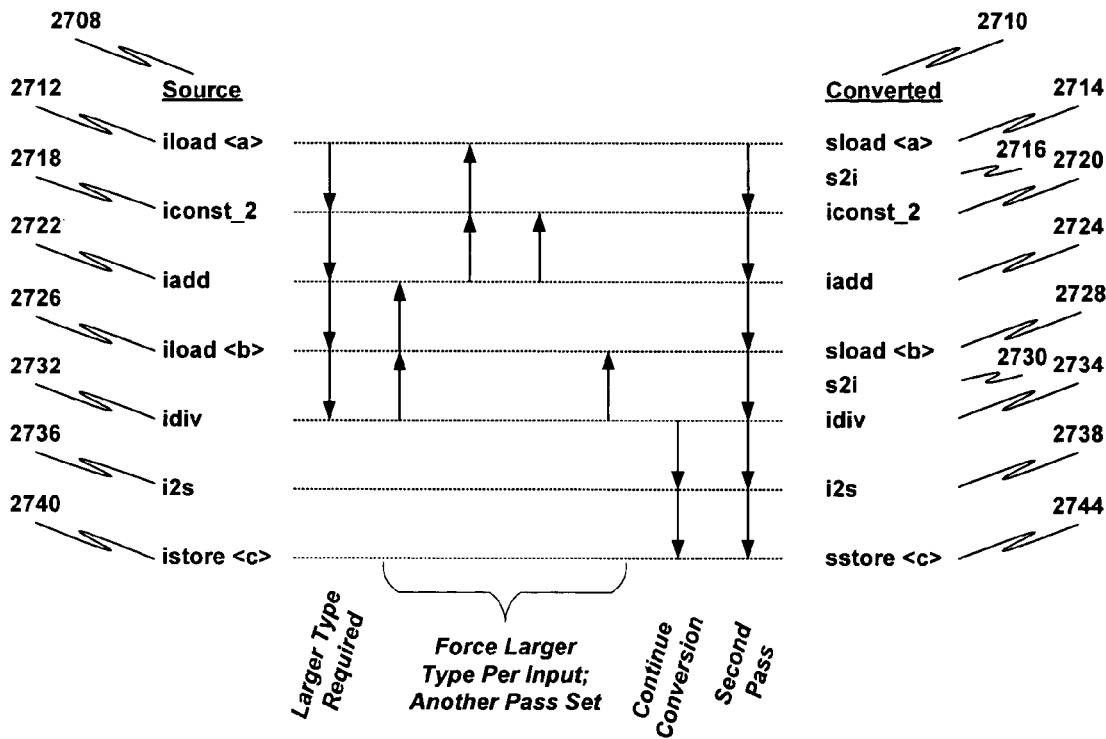
FIG. 27

… # OVERFLOW PREDICTIVE ARITHMETIC INSTRUCTION OPTIMIZATION USING CHAINING

CROSS REFERENCE TO RELATED APPLICATIONS

This Application is a continuation-in-part of application Ser. No. 10/686,513 filed on Oct. 14, 2003 in the name of inventors Zhiqun Chen and Judith Schwabe and entitled "Optimization of N-Base Typed Arithmetic Expressions", which is a continuation of application Ser. No. 10/002,437 filed Nov. 1, 2001 now U.S. Pat. No. 6,687,898 in the name of inventors Zhiqun Chen and Judith Schwabe and entitled "Optimization of N-Base Typed Arithmetic Expressions", which is a continuation of application Ser. No. 09/439,113 filed Nov. 12, 1999 (now U.S. Pat. No. 6,363,523) in the name of inventors Zhiqun Chen and Judith Schwabe and entitled "Optimization of N-Base Typed Arithmetic Expressions", commonly assigned herewith.

This application is related to the following:

U.S. patent application Ser. No. 09/243,101, filed Feb. 2, 1999 in the name of inventors Joshua Susser and Judith Schwabe and entitled "Object-Oriented Instruction Set for Resource-Constrained Devices", commonly assigned herewith;

U.S. patent application Ser. No. 10/712,475, filed Nov. 12, 2003 in the name of inventors Judith Schwabe and Zhiqun Chen, entitled "Predictive Arithmetic Overflow Detection", commonly assigned herewith;

U.S. patent application Ser. No. 10/712,463, filed Nov. 12, 2003 in the name of inventors Judith Schwabe and Zhiqun Chen, entitled "Optimization of N-Base Typed Arithmetic Instructions via Rework", commonly assigned herewith;

U.S. patent application Ser. No. 10/712,919, filed Nov. 12, 2003 in the name of inventors Judith Schwabe and Zhiqun Chen, entitled "Overflow Predictive Arithmetic Instruction Optimization Using Chaining", commonly assigned herewith.

FIELD OF THE INVENTION

The present invention relates to the field of computer science. More particularly, the present invention relates to a system and method for overflow predictive arithmetic instruction optimization using chaining.

BACKGROUND OF THE INVENTION

Preparation of a computer program is illustrated in FIG. 1. The user writes programs in a high-level programming language 100. The programs written in the high-level program language 100 are compiled into a low-level machine language 105, which can be executed by the targeted machine. For example, programs written in the high-level Java™ programming language are compiled into low level bytecode instructions. The bytecode instructions are the machine language for a Java™ Virtual Machine. The Java™ Virtual Machine Specification is described in Lindholm et al., "The Java™ Virtual Machine Specification", 1999, Addison Wesley, Second Edition.

Typical high-level programming languages support arithmetic expressions. Arithmetic expressions are defined by an arithmetic operator that operates on one or more operands. Operators typically supported include addition, subtraction, multiplication, division, remainder, negate, shift, bitwise OR, bitwise AND and bitwise exclusive OR. Intermediate values are the results of one or more arithmetic operations.

High-level languages also typically support multiple or n-base integral types and arithmetic operations are overloaded. Overloading allows operators to accept operands having mixed types. For example, the Java™ programming language supports four base integral types: "byte", "short", "int" and "long". These types support 8-, 16-, 32- and 64-bit values, respectively. Operators such as the "+" operator may accept operands of any of these integral types. The three examples below illustrate overloading the "+" operator for operations on operands having mixed base types.

int a, b;
a+b;
short a, b;
a+b;
byte a, b;
a+b;

This overloading is typically performed by widening values to a wider base type and then performing the arithmetic operation. For example, C and Java™ compilers typically widen values of type "byte" and "short" to type "int". In the Java™ language, type "int" is always 32 bits. Thus, 16-bit values of type "short" and 8-bit values of type "byte" are widened to the 32-bit type "int" before performing the arithmetic operation. In the Java™ language, the following byte code is generated for each of the three examples listed above:

iload a
iload b
iadd

The "iload" instruction loads any of the 8, 16 or 32-bit variables and puts a 32-bit operand on the stack. The "iadd" instruction pops two 32-bit operands off the stack, adds them and puts the 32-bit result back on the stack.

Unlike Java™, some high-level languages define only the relationship between the integral types, and not the size of each type. For example, one C compiler vendor may define the bit sizes of types "byte", "short" and "int" to be 8, 16 and 32 bits, respectively. However, another C compiler vender may define the sizes of the same types to be 16, 32 and 64 bits, respectively. Yet another compiler may define the bit sizes to be 16, 32 and 32 bits, respectively. In all cases, the relationship between the sizes of each type is maintained (number of values represented by type "byte"<number of values represented by type "short", number of values represented by type "short"<number values represented by type "int"), but the actual number of bits used to represent each type may differ. Like Java™, however, C performs arithmetic operations in the size of the "int" type defined by each particular compiler. This requires widening values having a smaller base type to type "int".

This type widening approach reduces the number of machine instructions, thus reducing the complexity of the target machine. However, this type widening typically requires more computational stack space. For example, adding two 16-bit values of type "short" after they have been widened to the 32-bit type uses the same amount of stack space as adding two 32-bit values of type "int", as illustrated in FIG. 2.

Turning now to FIG. 2, a flow diagram that illustrates stack usage when adding two 16-bit values of type "short" in the Java™ language is illustrated. At 200, the first 16-bit operand is loaded and pushed onto the operand stack. The operand stack at this point is illustrated by reference numeral 225. At 205, the first 16-bit operand is expanded to 32 bits (230). At 210, the second 16-bit operand is loaded and pushed onto the operand stack 235. At 215, the second 16-bit operand is expanded to 32 bits (240). At this point, the operand stack occupies 4×16=64 bits. At 220, the two 32-bit operands are added using a 32-bit "add" operator, leaving the 32-bit result on the stack 245.

Turning now to FIG. 3, a flow diagram that illustrates stack usage when adding two 32-bit values of type "int" is presented. At 300, the first 32-bit operand is loaded and pushed onto the operand stack 315. At 305, the second 32-bit operand is loaded and pushed onto the operand stack 320. At 310, the two 32-bit operands are added using a 32-bit "add" operator, leaving the 32-bit result on the stack 325. Thus, in the 16-bit "add" and the 32-bit "add" examples above, two 32-bit operands are pushed onto the stack before being popped off the stack and added using a 32-bit "add" operation.

During the course of program execution, the stack size may vary in size due to factors such as the level of nested procedure calls, the complexity of computed expressions and the number of locally declared variables. On resource-constrained devices such as smart cards, there is typically insufficient memory available to perform such computations where type widening takes place.

Resource-constrained devices are generally considered to be those that are relatively restricted in memory and/or computing power or speed, as compared to typical desktop computers and the like. By way of example, other resource-constrained devices include mobile telephones, boundary scan devices, field programmable devices, personal digital assistants (PDAs) and pagers and other miniature or small footprint devices.

Smart cards, also known as intelligent portable data-carrying cards, generally are made of plastic or metal and have an electronic chip that includes an embedded microprocessor or microcontroller to execute programs and memory to store programs and data. Such devices, which can be about the size of a credit card, have computer chips with 8-bit or 16-bit architectures. Additionally, these devices typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

Furthermore, smart cards with 8-bit or 16-bit architectures typically have built-in 8-bit or 16-bit arithmetic operations, respectively. As such, smart cards can typically perform 8-bit or 16-bit operations more efficiently than 32-bit operations. Performing 32-bit operations on data that has been widened to 32-bits is especially inefficient. Thus, the limited architecture and memory of resource-constrained devices such as smart cards make it impractical or impossible to execute programs where the values have been widened to a larger integral type.

The Java™ Virtual Machine instruction set defines an arithmetic instruction set to handle values of integral types "byte", "short" and int. Variables of type "byte" and "short" are widened to the integral type "int" during compilation. By contrast, the Java Card™ (the smart card that supports the Java™ programming language) Virtual Machine defines a separate instruction set to handle variables of type "byte" and "short", in addition to the instruction set to handle variables of integral type "int". Most Java Card™ applications operate on data values of type "short" or "byte".

There is an increasing trend in the computer industry to support high-level computer languages designed for execution on relatively memory-rich desktop computers, such that the same programs can be run on resource-constrained devices, thus achieving interoperability across vertical platforms. This interoperability across vertical platforms requires that programs written in the high-level programming language render the same result when run on resource-constrained devices as they would when ran on relatively memory-rich devices. For example, it is desirable to support execution of programs written in the Java™ programming language on a variety of platforms including smart card platforms, hand-held devices, consumer appliances, desktop computers and supercomputers.

SUMMARY OF THE INVENTION

A method for arithmetic expression optimization includes receiving an operator and at least one operand of a first instruction defined for a first processor having a first base. The method also includes converting the first instruction to a second instruction optimized for a second processor having a second base smaller than the first base when overflow is impossible based at least in part on the operator and the relationship between the operand type and the second base. The method also includes converting instructions in an instruction chain to a wider base larger than the second base and smaller or equal to the first base when the at least one operand carries potential overflow beyond the second base and when the operator is sensitive to overflow. The chain is bounded by the second instruction and a third instruction that has been previously optimized and is the source of the potential overflow.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 7A is a code sample that illustrates the addition of two values of type "short" on a desktop computer.

FIG. 7B is a code sample that illustrates the addition of two values of type "short" on a resource-constrained computer.

FIG. 8A is a code sample that illustrates the addition of two values of type "short" and immediately casting the result on a desktop computer.

FIG. 8B is a code sample that illustrates immediately casting the result of an operation that potentially carries overflow on a resource-constrained computer.

FIG. 9A is a code sample that illustrates the addition of three values of type "short" and immediately casting the result on a desktop computer.

FIG. 9B is a code sample that illustrates performing an operation that is not affected by overflow on operands created by an operation that potentially carries overflow on a resource-constrained computer.

FIG. 10A is a code sample that illustrates the addition of two values of type "short" and dividing the result by a value of type "short" on a desktop computer.

FIG. 10B is a code sample that illustrates performing an operation that is affected by overflow on operands created by an operation that the potential for overflow on a resource-constrained computer.

FIG. 27 is a high-level block diagram that illustrates conversion of an arithemetic expression that cannot be optimized to smaller type instructions in accordance with one embodiment of the present invention.

DETAILED DESCRIPTION

Figure 1:
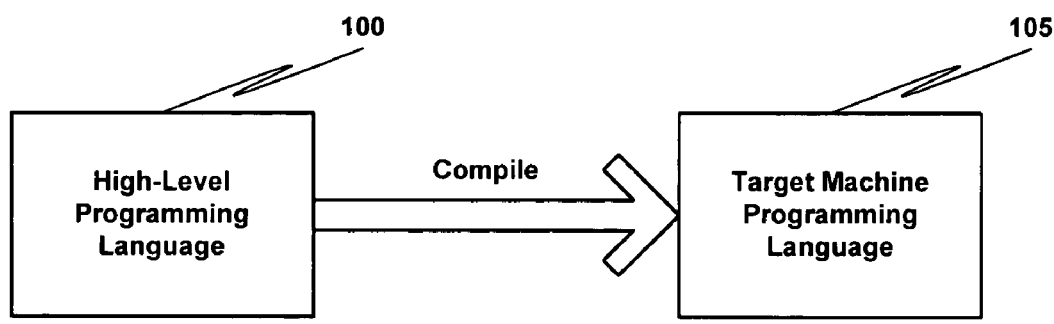
FIG. 1 is a block diagram that illustrates compiling a program written in a high-level language.
Figure 2:
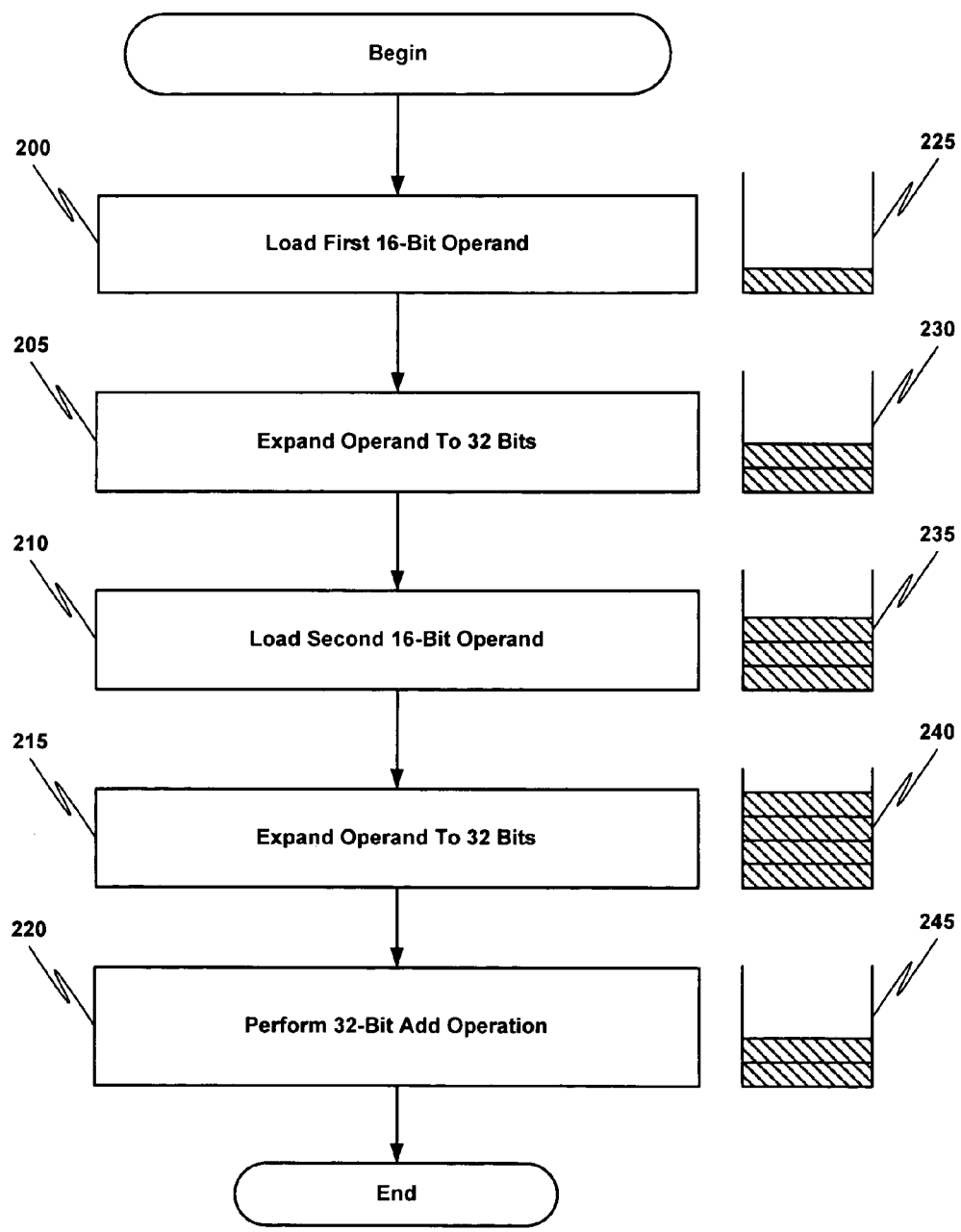
FIG. 2 is a flow diagram that illustrates stack usage for adding two 16-bit operands widened to 32-bits.
Figure 3:
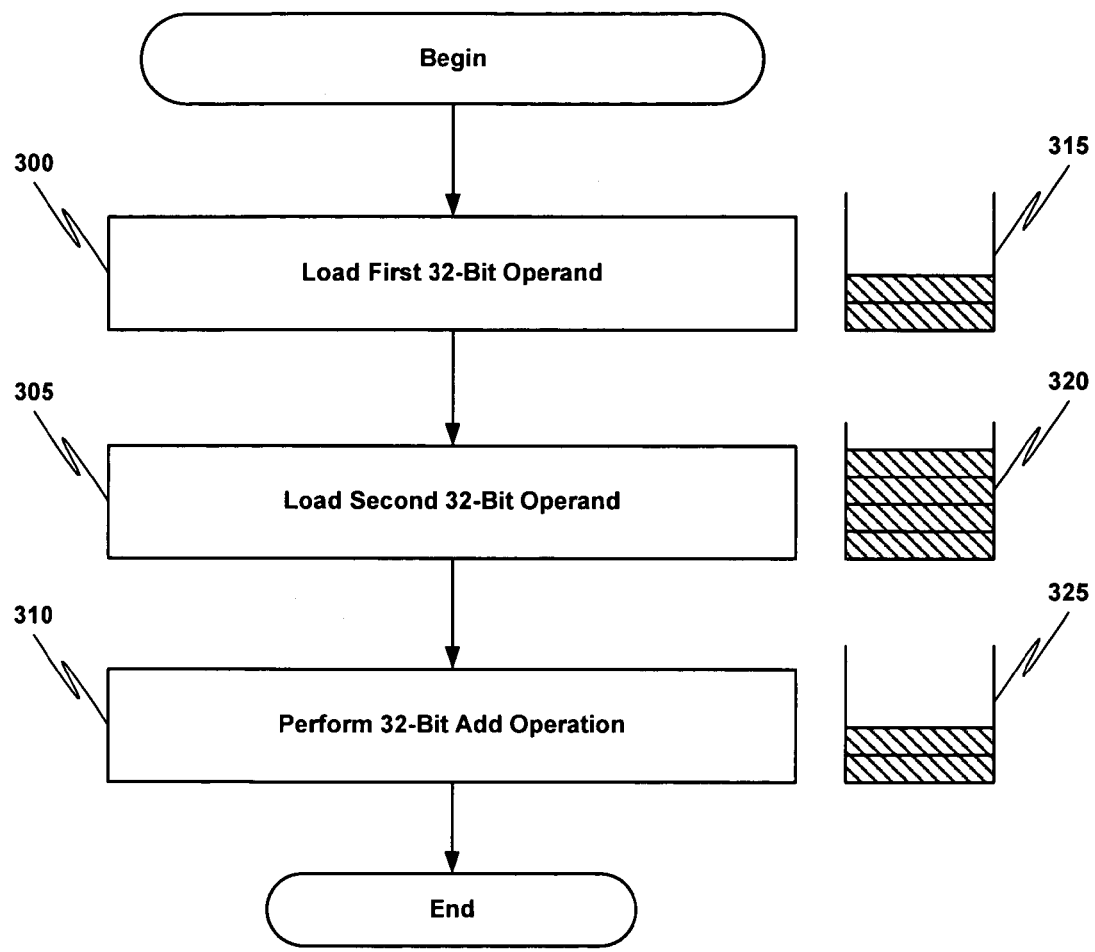
FIG. 3 is a flow diagram that illustrates stack usage for adding two 32-bit operands.

Embodiments of the present invention are described herein in the context of a method and apparatus for overflow predictive arithmetic instruction optimization using chaining. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "processor" may be used to refer to a physical computer or a virtual machine.

Figure 4:
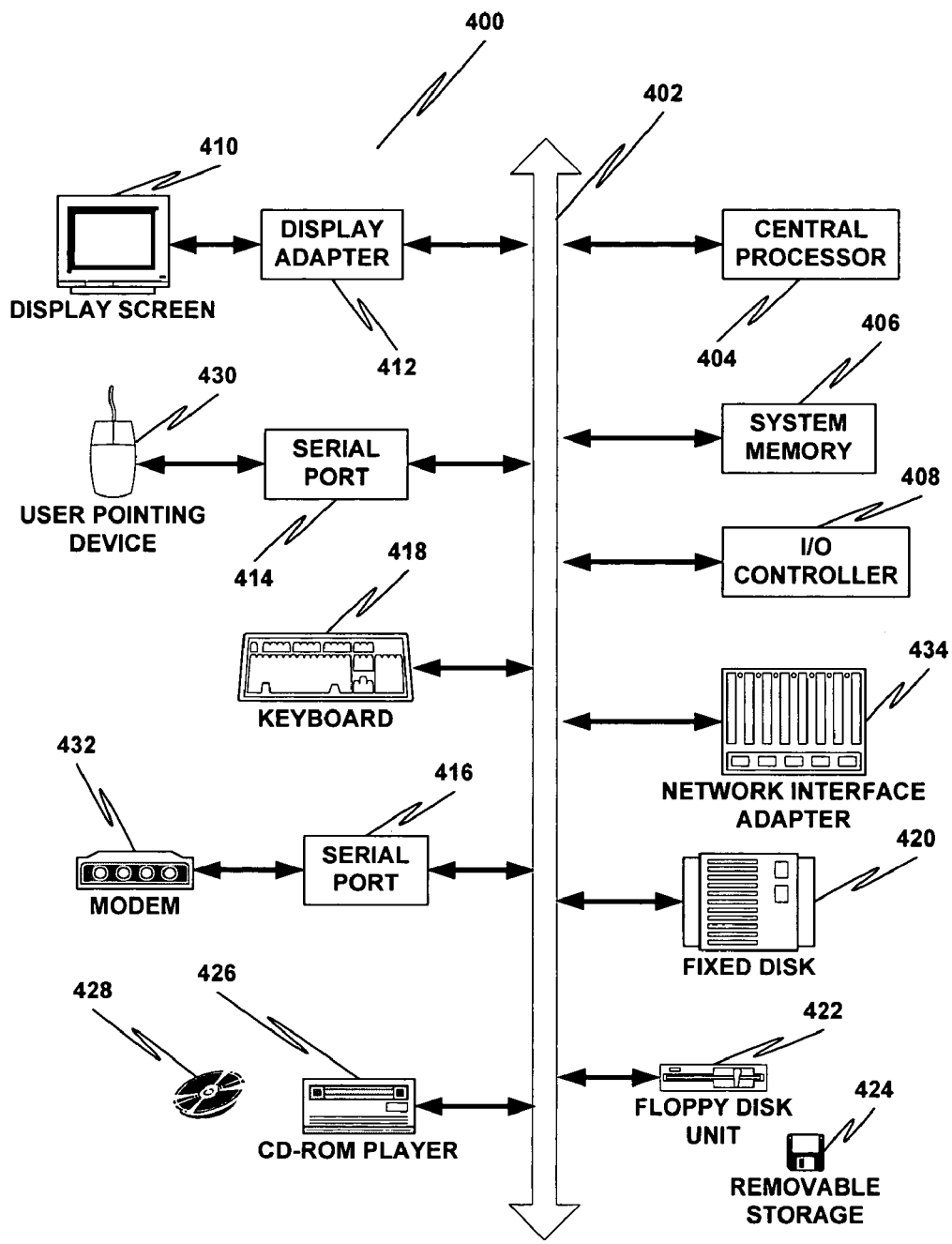
FIG. 4 is a block diagram of a client computer system suitable for implementing aspects of the present invention.

FIG. 4 depicts a block diagram of a computer system 400 suitable for implementing aspects of the present invention. As shown in FIG. 4, computer system 400 comprises a bus 402 which interconnects major subsystems such as a central processor 404, a system memory 406 (typically RAM), an input/output (I/O) controller 408, an external device such as a display screen 410 via display adapter 412, serial ports 414 and 416, a keyboard 418, a fixed disk drive 420, a floppy disk drive 422 operative to receive a floppy disk 424, and a CD-ROM player 426 operative to receive a CD-ROM 428. Many other devices can be connected, such as a pointing device 430 (e.g., a mouse) connected via serial port 414 and a modem 432 connected via serial port 416. Modem 432 may provide a direct connection to a remote server via a telephone link or to the Internet via a POP (point of presence). Alternatively, a network interface adapter 434 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in system memory 406 or stored on storage media such as fixed disk 420, floppy disk 424 or CD-ROM 428.

Resource-constrained devices are generally considered to be those that are relatively restricted in memory and/or computing power or speed, as compared to typical desktop computers and the like. Although the particular implementation discussed below is described in reference to a smart card, the invention can be used with other resource-constrained devices including, but not limited to, mobile telephones, boundary scan devices, field programmable devices, personal digital assistants (PDAs) and pagers, as well as other miniature or small footprint devices. The invention can also be used on non-resource-constrained devices.

Figure 5:
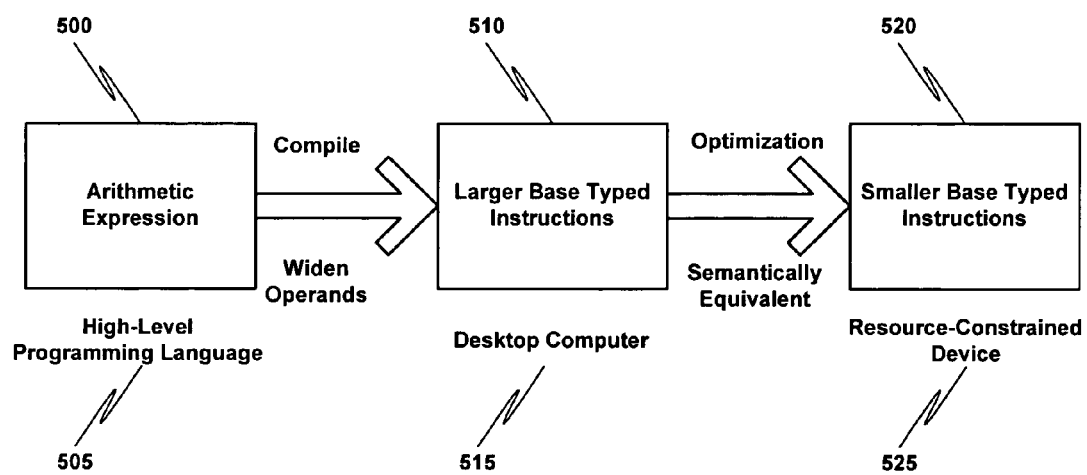
FIG. 5 is a block diagram that illustrates converting arithmetic expressions for execution on a resource-constrained device according to one embodiment of the present invention.

Turning now to FIG. 5, a block diagram that illustrates converting arithmetic expressions for execution on a resource-constrained device according to one embodiment of the present invention is presented. A compiler takes arithmetic expressions 500 written in a high-level language 505 and widens the operands to a larger integral type, creating larger base typed instructions 510 for execution on a typical desktop machine 515. The larger base typed instructions 510 are optimized to semantically equivalent smaller base typed instructions 520 for execution on a resource-constrained device 525. For example, a "short"-type addition instruction is used to operate on "short"-typed operands, and the result is type "short".

According to another embodiment of the present invention, the optimization to semantically equivalent smaller base typed instructions is part of a just-in-time code generator. Just before a set of instructions is executed for the first time, the unoptimized instructions are optimized to semantically equivalent smaller base typed instructions for execution on a resource-constrained device. Subsequent execution of the same set of instructions use the set of optimized instructions.

According to another embodiment of the present invention, when a larger type instruction 510 is required to preserve the semantics of an arithmetic instruction, and larger type instructions are not supported by the target processor, the arithmetic expression is rejected as not supported.

Figure 6:
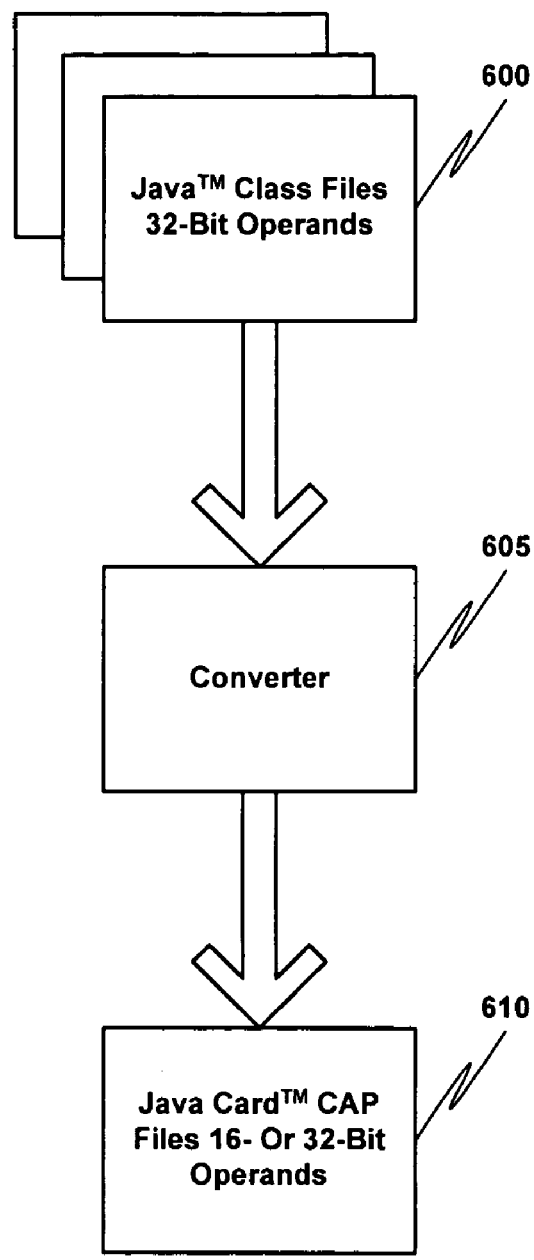
FIG. 6 is a block diagram that illustrates converting Java™ class files in accordance with one embodiment of the present invention.

Turning now to FIG. 6, a block diagram that illustrates converting instructions in accordance with one embodiment of the present invention is presented. Java™ class files 600 containing instructions with 32-bit operands are received by a Java Card™ class file converter 605. The converter 605 generates instructions 610 optimized for execution on a resource-constrained device. The optimizations include, by way of example, providing less stack usage, smaller program size and faster execution.

Target machines may support n-typed arithmetic operators. While the Java™ Virtual Machine supports type "int" operators, the Java Card™ Virtual Machine supports type "short" operators and optionally supports type "int" operators. Other devices may support only "byte" typed arithmetic operations, or all of "byte"-, "short"- and "int"-typed operations. Typically, relatively less time is required to perform 16-bit arithmetic on an 8-bit or 16-bit processor and relatively more time is required to perform 32-bit arithmetic on the same processor.

Since the actual values used in an arithmetic operation are not known at optimization time, the optimization must assume the worst case value for each operand. The worst case value for an operand is determined based upon the input operand type. A small-type operation can have results that require large-type representation or overflow into a larger type. Thus, according to embodiments of the present invention, arithmetic operators are categorized into operators affected by overflow and operators with the potential to create overflow. For the purposes of this disclosure, overflow comprises the underflow of negative values. The result of a small-type operation is said to carry potential overflow if the operator used to create the result belongs to the group of operators with the potential to create overflow into a large-type representation. Intermediate values are allowed to carry potential overflow as long as the intermediate value is not used as an operand for an operator belonging to the group of operators affected by overflow.

The operators with a potential to create overflow comprise addition, subtraction, multiplication, division, negate and left-shift. The Java™ bytecodes for these operators are shown in Table 1.

TABLE 1

Operations with Potential Overflow
Java ™ Bytecode iadd
isub
imul
idiv
ineg
ishl The operators affected by overflow are shown in Table 2. The arithmetic operators affected by overflow comprise division, remainder, negate, right-shift and unsigned right-shift. Non-arithmetic operators affected by overflow comprise array operations, switch operations and compare operations.

TABLE 2

Operations Affected by Overflow

| Java ™ Bytecode | Operation Type | Which Operand(s) Affected by Overflow |
| --- | --- | --- |
| idiv | Arithmetic | both input operands |
| irem | Arithmetic | both input operands |
| ineg | Arithmetic | only has one operand |
| ishr | Arithmetic | operand being shifted only |
| iushr | Arithmetic | operand being shifted only |
| if<*> | Compare | only has one operand |
| if_icmp<*> | Compare | both operands to the compare |
| tableswitch | Switch | switch value |
| lookupswitch | Switch | switch value |
| *newarray | array | number of elements |
| *aload | array | array index |
| *astore | array | array index |

When optimizing Table 1 operations to a smaller type, the result may overflow into the larger type. The result of an expression with one of the operators in Table 2 may lose precision if one of the operands in the expression is an intermediate value and contains potential overflow data. To enable optimization and preserve the semantics of the high-level source code, the potential overflow must be corrected using an explicit source level cast to the type of the result if the result is input to one of the operations in Table 2.

If input operand(s) to any of the operations in Table 2 are the result of an operation in Table 1 and an explicit high level source code cast is not present, optimization cannot occur. Such an erroneous optimization would not guarantee a semantically equivalent result. In other words, the optimized code generated for execution on a resource-constrained device could render a result different than the non-optimized code generated for a desktop computer. For example, overflow data could be present in the Java™ 32-bit representation of the operand(s), but not in the Java Card™ 16-bit representation.

The result of operations with the operators listed in Table 1 may cause overflow if an operator with a smaller type is applied. Examples of these problems associated with optimizing instructions targeted to a desktop computer platform to instructions targeted to a resource-constrained computer platform are provided in FIGS. 7A–10B. The examples assume the desktop computer is based on a 32-bit architecture and is relatively memory rich. The resource-constrained computer is assumed to be based on a 16-bit architecture with relatively little memory. Those of ordinary skill in the art will recognize the invention applies to computing platforms having various architectures.

FIGS. 7A–10B also use signed values. Those of ordinary skill in the art will also recognize that overflow may occur regardless of whether the values are signed or unsigned.

Turning now to FIG. 7A, a code sample that illustrates the addition of two values of type "short" on a desktop computer is illustrated. The value "a" contains the maximum value that can be represented by a 16-bit signed "short" type. As described above, even though the values are 16-bit "short" values, "int"-type addition is used. Thus, overflow from the 16-bit range to the 32-bit range is present in the result value and the effect of the overflow is to create a larger positive 32-bit number.

Turning now to FIG. 7B, a code sample that illustrates adding the same values as in. FIG. 7A on a resource-constrained computer is presented. Since execution is being performed on a resource-constrained computer and both values are 16-bit "short" types, the instructions are optimized to use "short"-typed addition, thus using less stack space. However, because 16-bit addition is used instead of 32-bit addition, the addition creates overflow in the sign bit. Whereas the desktop computer computed a value of 32,768, the result computed in the resource-constrained computer example is −32,768, a negative number. This result is unacceptable because it is different from the desktop computer result, preventing interoperability across multiple computer platforms.

Turning now to FIG. 8A, a code sample that illustrates the addition of two values of type "short" and immediately casting the result is presented. This example is the same as that in FIG. 7A, except that the result of the addition is cast to type "short". Casting the type to "short" truncates the most significant sixteen bits to a "short" value and sign extends to a 32-bit value. The result of an operation that potentially carries overflow (the "add" operation) is cast to type "short", thereby eliminating any potential overflow problem. FIG. 8B illustrates adding the same values as in FIG. 8A represented as 16-bit values on a resource-constrained computer. The result values for both the desktop computer and the resource-constrained computer are the same.

Turning now to FIG. 9A, a code sample that illustrates the addition of three values of type "short" on a desktop computer is presented. In the example, "int"-type addition is used to add 16-bit "short" values "a" and "b" and add the result to "c". The final result is cast to a "short" type.

Turning now to FIG. 9B, a code sample that illustrates performing an operation that is not affected by overflow on operands created by an operation that potentially carries overflow on a resource-constrained computer is presented. Since all values in this example are 16-bit "short" types, "short"-typed addition is used for all intermediate additions. As indicated in Table 1, the addition operator potentially creates overflow, but is not affected by overflow. Thus, adding "a" and "b" creates a value that potentially carries overflow. This value is added to "c", creating another value that potentially carries overflow. Although the second "add" operation contains one operand that potentially carries overflow (the "a+b" result), the "add" operation is not affected by operands carrying overflow. The final result is cast to type "short", removing the potential overflow from the addition operation. Thus, the result values for both the desktop computer and the resource-constrained computer are the same.

Turning now to FIG. 10A, a code sample that illustrates the addition of two values of type "short" and dividing the result by a value of type "short" on a desktop computer is presented. Since execution is being performed on a desktop computer, "int"-type operations are used. The values "a" and "b" are added together using "int"-type "add". This intermediate value is divided by "c".

Turning now to FIG. 10B, a code sample that illustrates performing an operation that is affected by overflow on operands created by an operation that potentially carries overflow on a resource-constrained computer is presented. Since execution is being performed on a resource-constrained computer, "short"-type operations are used. The values "a" and "b" are added together using "short"-type "add". The addition creates an intermediate value having overflow from the 16-bit range. This intermediate value is divided by "c". Unlike the addition operator used in FIG. 7B, the division operator is affected by overflow, as shown in Table 2. The 16-bit value is considered to be negative, since the high bit is set. Thus, the desktop computer and resource-constraint computer examples provide different results that have not been corrected by type conversion expressed in the program as in FIGS. 8A–9B.

According to embodiments of the present invention, arithmetic expressions are optimized using typed instructions that are optimal based upon the types of operands. The optimization process proceeds until a potential overflow problem is encountered. At this point, instruction inputs are recursively changed from a smaller type to a larger type until the origin of the smaller type is reached. This process repeats until the appropriate type of instructions are chosen so that arithmetic expressions render the same result on desktop computers and on resource-constrained devices with optimized instruction sets.

Figure 11:
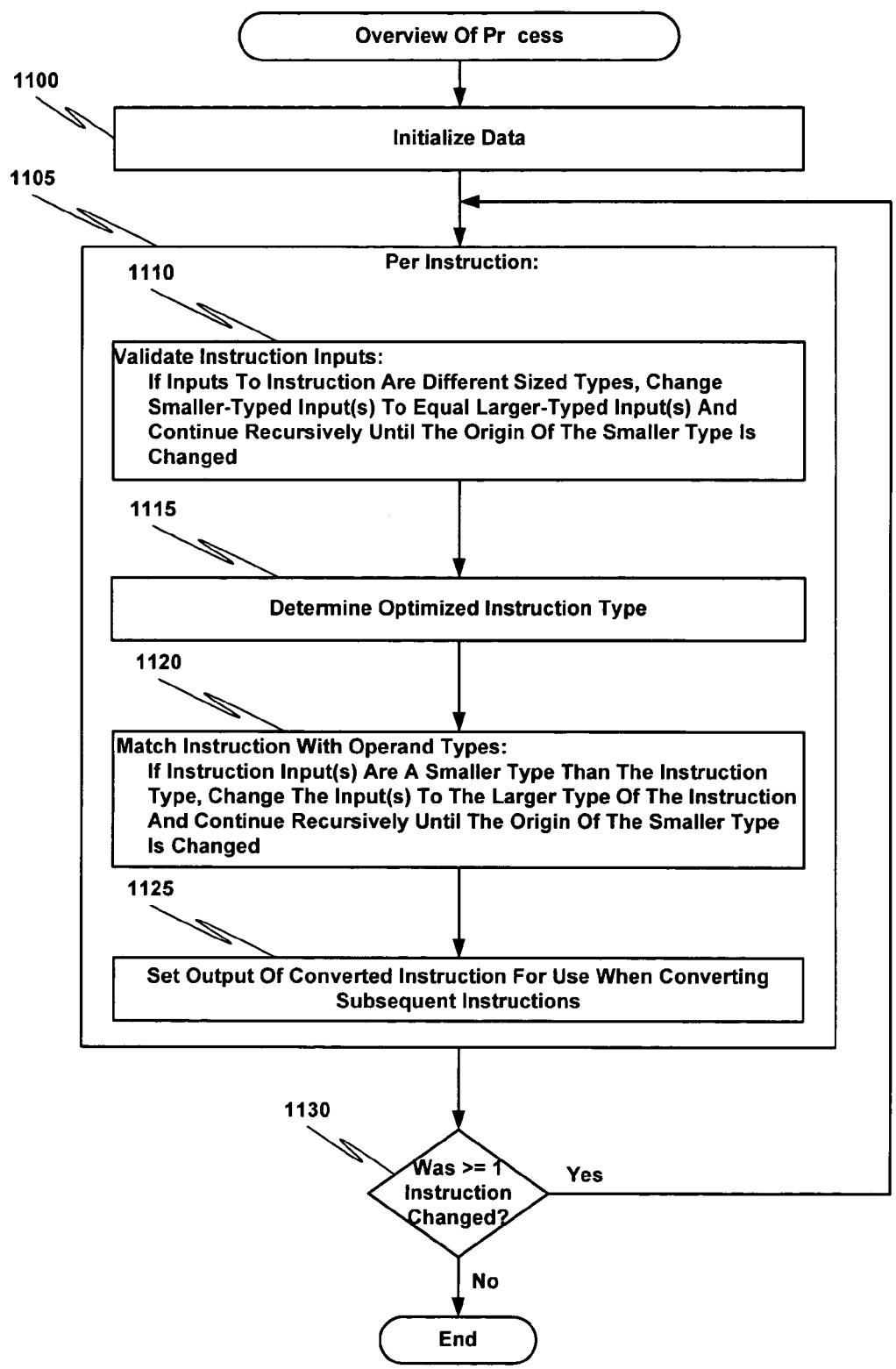
FIG. 11 is a flow diagram that illustrates a method for n-base typed arithmetic expression optimization in accordance with one embodiment of the present invention.
Figure 12:
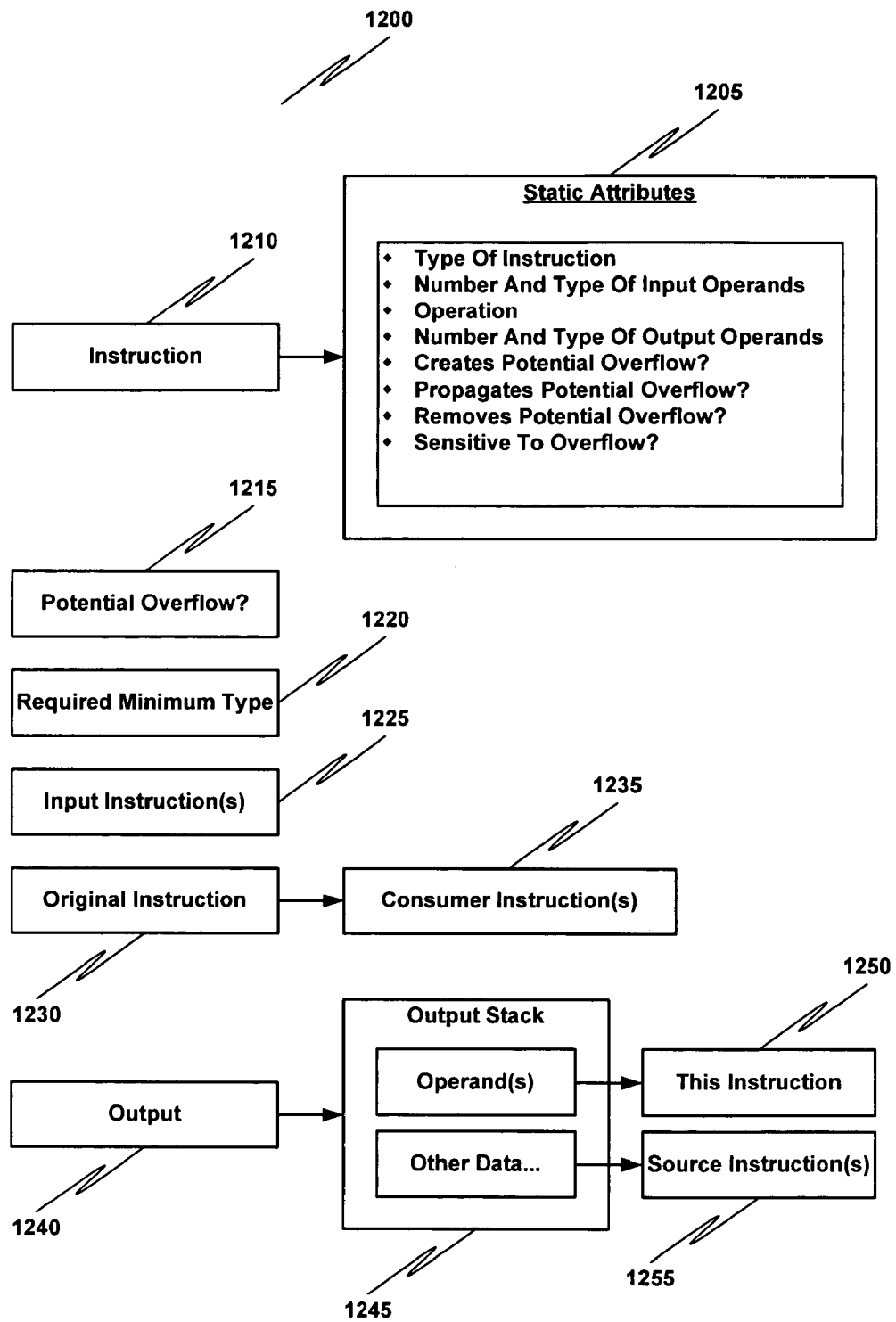
FIG. 12 is a block diagram that illustrates instruction data maintained during expression optimization in accordance with one embodiment of the present invention.

Turning now to FIG. 11, a flow diagram that illustrates a method for n-base typed arithmetic expression optimization in accordance with one embodiment of the present invention is presented. At 1100, data initialization is performed. FIG. 12 illustrates data initialized at 1100. Block 1105 is performed per instruction, starting with the first instruction and proceeding sequentially. At 1110, instruction inputs are validated. If the inputs to the instruction are different sized types, the smaller-typed inputs are changed to equal the larger-typed inputs. By way of example, if one instruction input is type "int" and another instruction input is type "short", the type "short" instruction input is changed to an "int" type. This process continues recursively until the origin of the smaller type and all of its subsequent instructions are changed to the larger type.

Still referring to FIG. 11, at 1115 the optimized instruction type is determined. At 1120, the instruction is matched with its operand types. If the instruction inputs are a smaller type than the instruction type, the instruction inputs are changed to the larger instruction type. This process of matching an instruction with its operand types continues recursively until the origin of the smaller type and all of its subsequent instructions are changed to the larger type.

Still referring to FIG. 11, at 1125 the output of the converted instruction is set for use when converting subsequent instructions. The actions for reference numerals 1110–1125 are repeated per remaining instruction. At 1130, a determination is made regarding whether at least one instruction was changed in the last pass through block 1105. If at least one instruction was changed, block 1105 is repeated for the set of instructions being optimized.

Turning now to FIG. 12, a block diagram that illustrates instruction data maintained during expression optimization in accordance with one embodiment of the present invention is presented. The instruction data 1200 may comprise the instruction 1210 and its associated static attributes 1205. The static attributes 1205 may comprise the type of instruction, the number and type of input operands, the operation and the number and type of output operands. The static attributes 1205 may also comprise an indicator of whether the instruction creates potential overflow, an indicator of whether the instruction propagates potential overflow, an indicator of whether the instruction removes potential overflow and an indicator of whether the instruction is sensitive to overflow. The instruction data may also comprise an indication of whether the instruction includes potential overflow 1215, any required minimum type 1220, any input instructions 1225, the original instruction 1230 and the instruction output 1240. The original instruction 1230 may include a link to each consumer instruction 1235. The instruction output 1240 may include a link to the output stack 1245 that may comprise one or more operands associated with the current instruction 1250. The output stack 1245 may also comprise other data associated with one or more source instructions 1255.

It is not necessary for all of the data shown in FIG. 12 to be present to practice the present invention. Furthermore, the data may be interrelated in different ways from that shown in FIG. 12.

Figure 13:
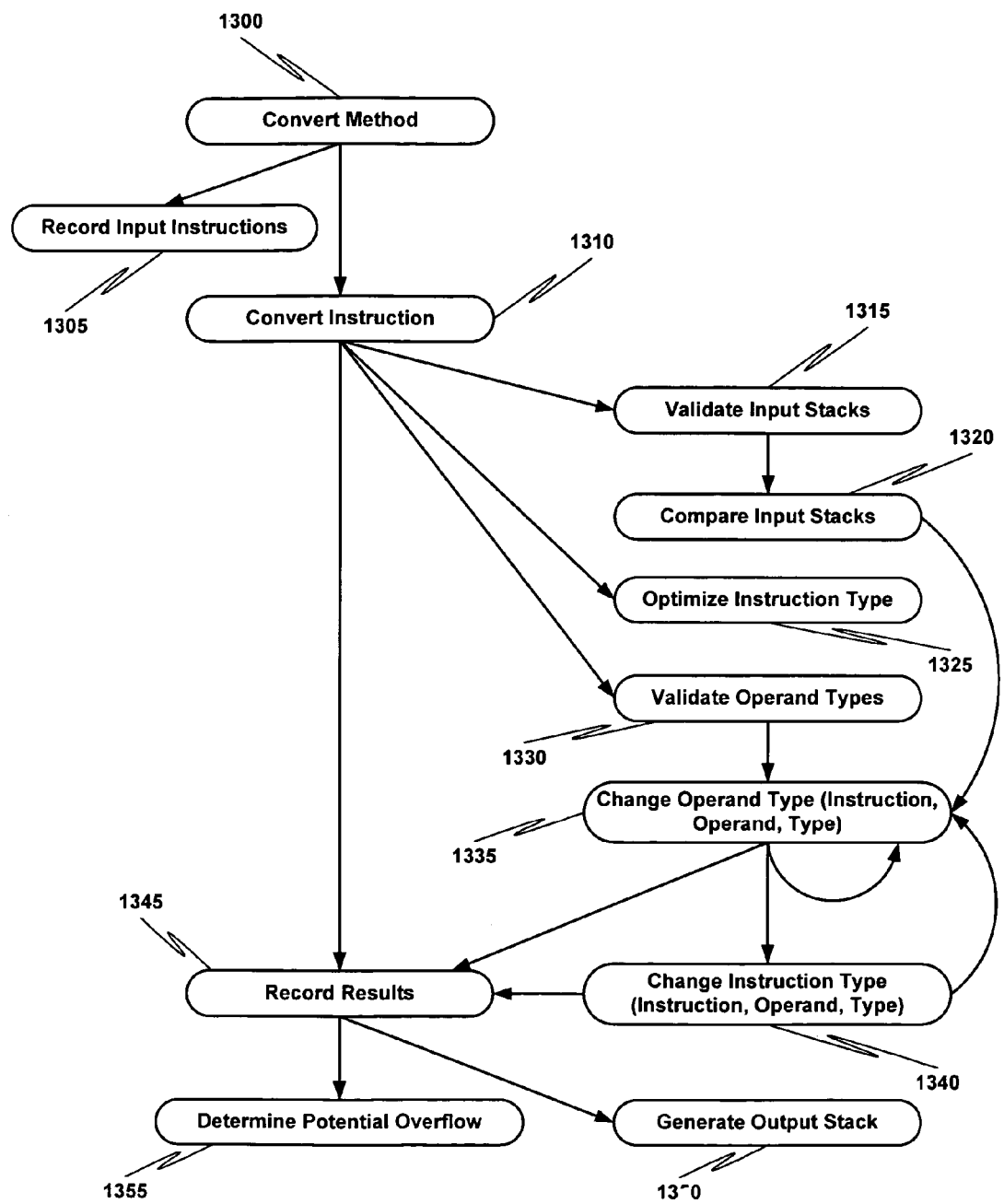
FIG. 13 is a block diagram that illustrates procedure- or method-calling relationships in accordance with one embodiment of the present invention.

Turning now to FIG. 13, a block diagram that illustrates procedure- or method-calling relationships in accordance with one embodiment of the present invention is presented. Converting a program unit such as a method, procedure or the like comprises recording input instructions 1305 and converting each instruction 1310. Converting each instruction 1310 comprises validating input stacks 1315, optimizing the instruction type 1325 to the smallest usable type, validating operand types 1330 and recording the results 1345. Validating input stacks 1315 comprises comparing the input stacks 1320 and changing the operand type 1335 from a smaller instruction type to a larger instruction type when necessary. The change operand type process 1335 proceeds recursively until the source of the smaller instruction type is found. For each instruction encountered during the recursion, the change instruction type process 1340 is invoked to change the type of the instruction. Validating operand type 1335 comprises changing the operand type 1335 if an instruction type is greater than an operand type. Recording results 1345 comprises determining potential overflow 1355 of a converted instruction and generating an output stack 1350 that includes the result of simulating the execution of the converted instruction.

Figure 14:
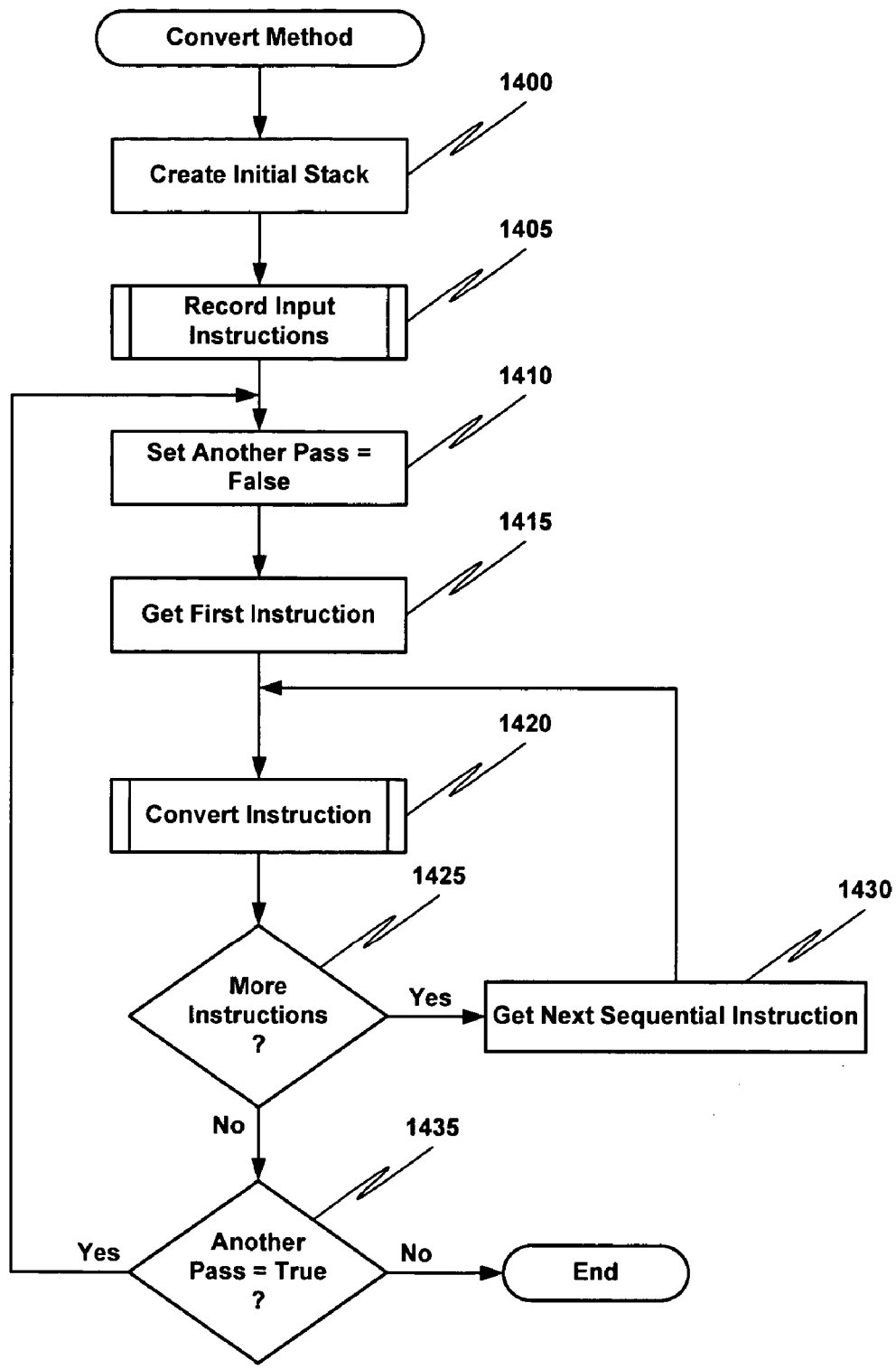
FIG. 14 is a detailed flow diagram that illustrates a method for n-base typed arithmetic expression optimization in accordance with one embodiment of the present invention.

Turning now to FIG. 14, a detailed flow diagram that illustrates a method for n-base typed arithmetic expression optimization in accordance with one embodiment of the present invention is presented. At 1400, an initial stack is created. The initial stack for the first instruction may comprise one or more parameters. The initial stack may also comprise one or more local variables. At 1405, input instructions are recorded. At 1410, an "another pass" flag is set to indicate that another instruction conversion pass is not required. At 1415, the first instruction is obtained. At 1420, the instruction is converted to an optimal type. At 1425, a determination is made regarding whether there are more instructions. If there are more instructions, the next sequential instruction is obtained at 1430 and the instruction is converted at 1420. When the instruction is converted at 1420, the "another pass" flag may be set to "true". If there are no more instructions, at 1435 the "another pass" flag is checked to determine whether another pass is required. If another conversion pass is required, it is initiated at 1410.

For the purposes of this disclosure, the "input instruction" of a current instruction refers to an instruction that is executed immediately prior to execution of the current instruction. By way of example, the "sload <b>" instruction of the following code sequence is an input instruction with respect to the "sadd" instruction:
sload <a>
sload <b>
sadd For the purposes of this disclosure, the "consumer instruction" of a current instruction refers to an instruction that is executed immediately subsequent to execution of the current instruction. By way of example, the "sadd" instruction of the above code sequence is a consumer instruction with respect to the "sload <b>" instruction. Other examples of consumer instructions and input instructions are presented herein. Because an input instruction may be a branch instruction, an input instruction may be associated with one or more consumer instructions. Similarly, a consumer instruction may be associated with one or more input instructions. By way of example, in FIG. 29, the "L2: iadd" instruction (2930) has two input instructions: "goto L2" (2918) and "iload <c>" (2926). Similarly, "if_eq L1" (2904) has two consumer instructions: "iload <a>" (2908) and "L1: iload <a>" (2922).

Figure 15:
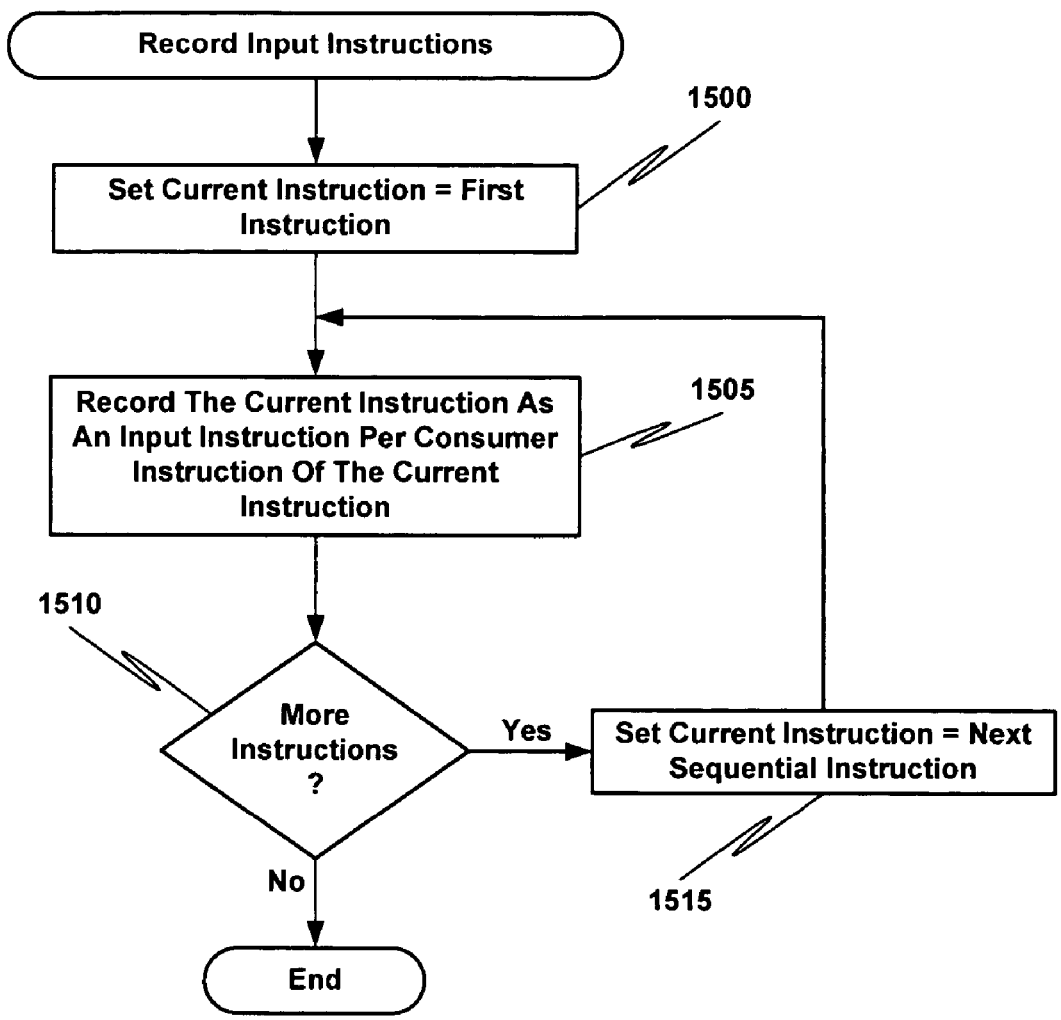
FIG. 15 is a flow diagram that illustrates a method for recording input instructions in accordance with one embodiment of the present invention.

Turning now to FIG. 15, a flow diagram that illustrates a method for recording input instructions in accordance with one embodiment of the present invention is presented. FIG. 15 provides more detail for reference numeral 1405 of FIG. 14. At 1500, the current instruction is set to the first instruction. At 1505, the current instruction is recorded as an input instruction for each consumer instruction of the current instruction. By way of example, if the current instruction is a branch instruction that sets the program counter to a first address or a second address based upon the state of a variable, the current instruction is recorded as an input instruction for both the instruction located at the first address and the instruction located at the second address. At 1510, a determination is made regarding whether more instructions remain. If more instructions remain, at 1515 the current instruction is set to the next sequential instruction. This process continues until the input instructions for each instruction are recorded.

Figure 16:
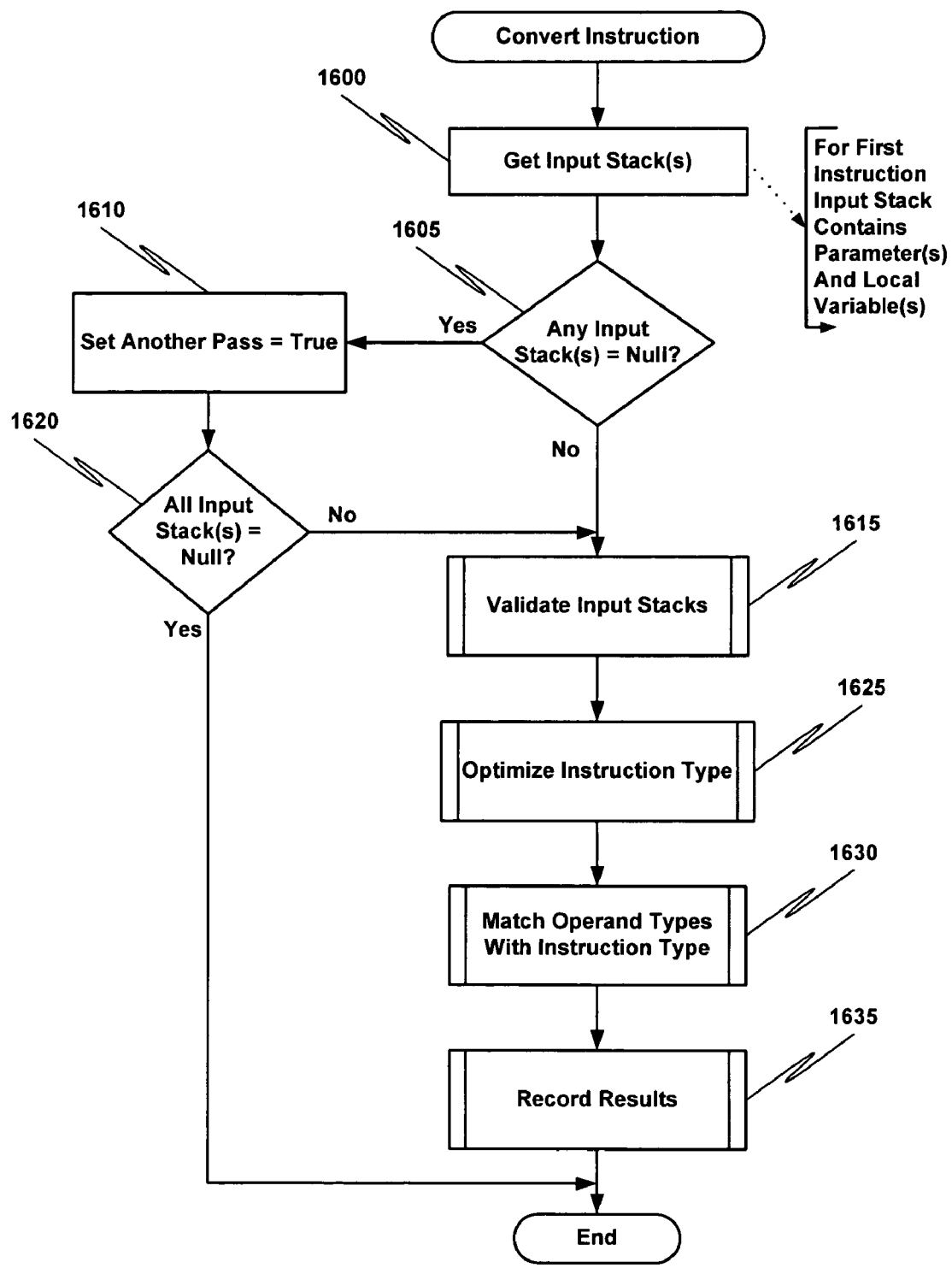
FIG. 16 is a flow diagram that illustrates a method for converting an instruction in accordance with one embodiment of the present invention.

Turning now to FIG. 16, a flow diagram that illustrates a method for converting an instruction in accordance with one embodiment of the present invention is presented. FIG. 16 provides more detail for reference numeral 1420 of FIG. 14. At 1600, the input stacks for the instruction to be converted are received. The number of input stacks associated with an instruction corresponds to the number of input instructions associated with the instruction. By way of example, if a particular instruction has three input instructions, the instruction has three input stacks, each of which is associated with one of the three input instructions. At 1605, a determination is made regarding whether any of the input stacks are empty or nonexistent. If any of the input stacks are null, then the corresponding input instruction has not yet been converted and an indication that another pass is required is set at 1610. If at least one input stack is non-empty, the input stacks are validated at 1615 to ensure that corresponding entries in input stacks have the same types and to ensure that the input stacks have the correct number of operands and type of operands. At 1625, the instruction type is optimized based on instruction inputs to determine the smallest usable instruction type. At 1630, the operand types are matched with the instruction type to ensure that the type of operands in the input stack are compatible with the instruction requirements. At 1635, the results are recorded by performing the operations of the instructions on the stack.

Figure 17:
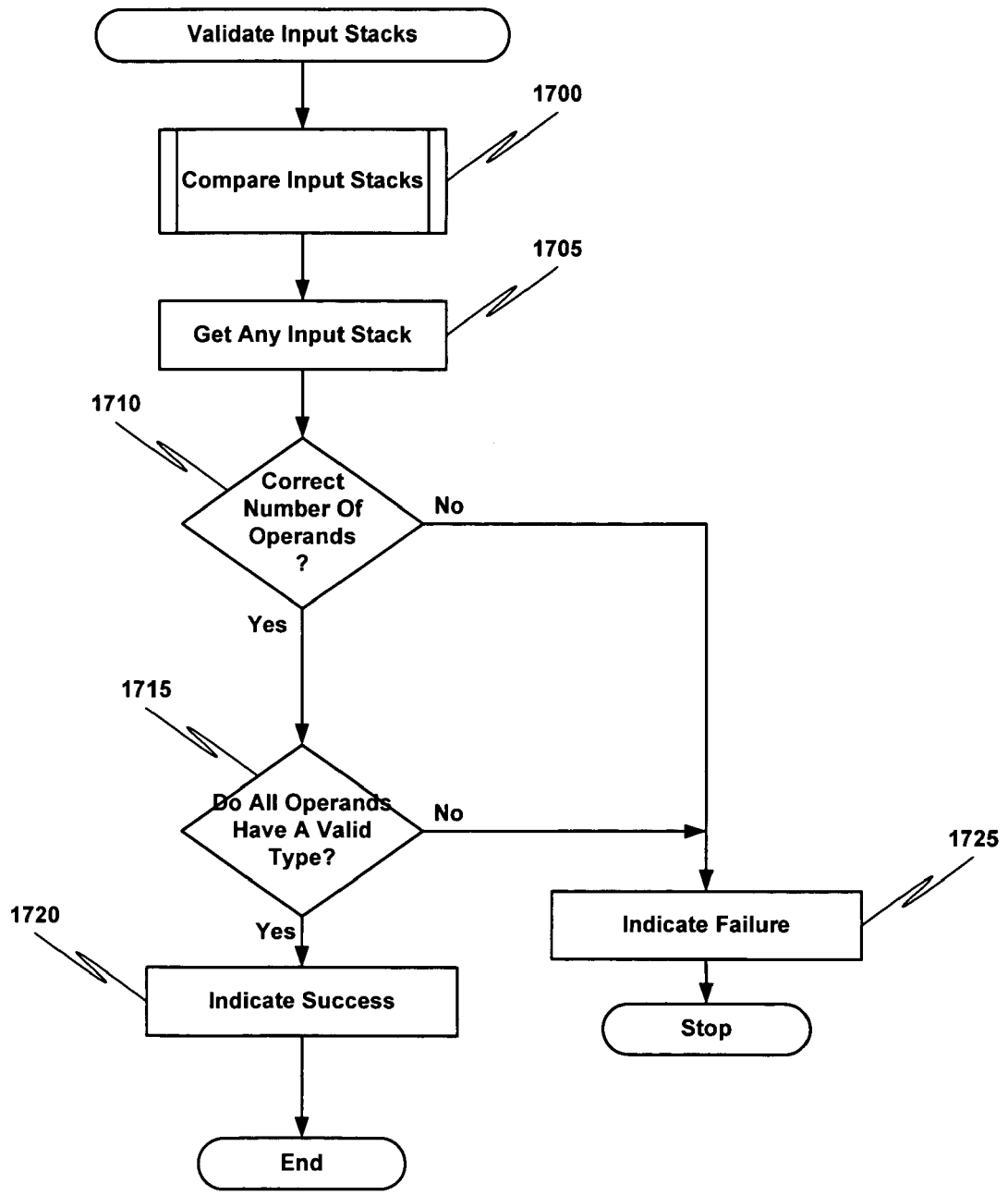
FIG. 17 is a flow diagram that illustrates a method for validating input stacks in accordance with one embodiment of the present invention.

Turning now to FIG. 17, a flow diagram that illustrates a method for validating input stacks in accordance with one embodiment of the present invention is presented. FIG. 17 provides more detail for reference numeral 1615 of FIG. 16. At 1700, if the current instruction is associated with multiple input stacks, the input stacks are compared to determine whether corresponding entries in each input stack have equivalent types and that the types are the same size. At 1705, one of the input stacks is received. At 1710, a determination is made regarding whether the input stack has the correct number of operands. An input stack has the correct number of operands if the number of operands in the input stack is at least as much as the number of operands defined for the current instruction. By way of example, if the current instruction is "iadd" and the "iadd" instruction adds two numbers, the input stack has the correct number of operands if the input stack comprises two or more operands. If the input stack has the correct number of operands, at 1715 a determination is made regarding whether all operands have a valid type. An operand has a valid type if the operand type is defined for the current instruction. By way of example, if the current instruction were a compare instruction that accepts a boolean operand, an input stack having a single pointer-type operand would be invalid. If the operand has an invalid type or if the input stack has an incorrect number of operands, an error is indicated at 1725 and instruction conversion terminates.

Figure 18:
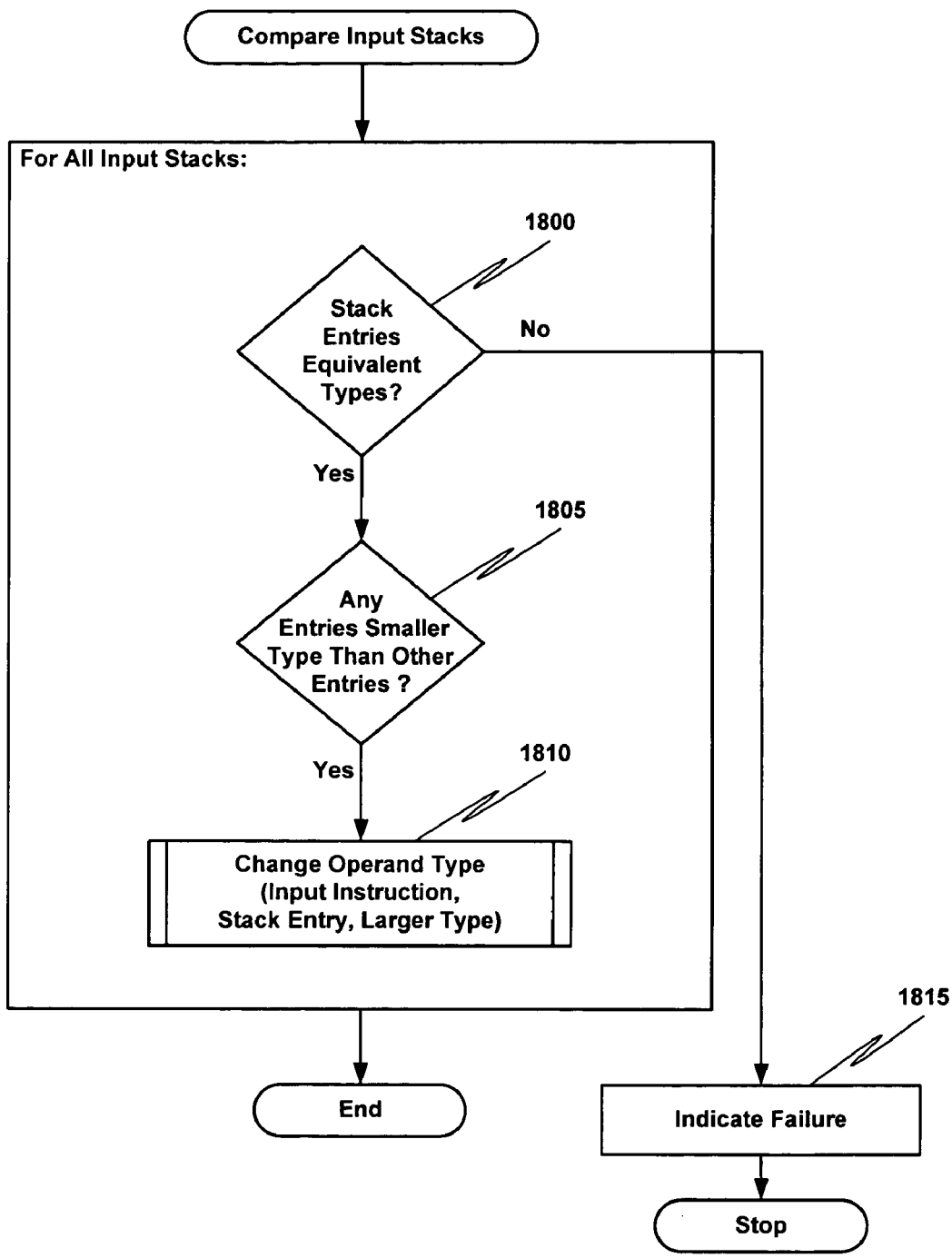
FIG. 18 is a flow diagram that illustrates a method for comparing input stacks in accordance with one embodiment of the present invention.

Turning now to FIG. 18, a flow diagram that illustrates a method for comparing input stacks in accordance with one embodiment of the present invention is presented. FIG. 18 provides more detail for reference numeral 1700 of FIG. 17. At 1800, a determination is made regarding whether the stack entries of each input stack have equivalent types. Stack entries of multiple input stacks have equivalent types if the types of corresponding stack entries of each stack are equivalent. By way of example, an input stack having two integer type entries is equivalent to another input stack having two integer type entries, but it is not equivalent to an input stack having two boolean type entries. If the stack entries of each input stack do not have equivalent types, a failure indication is made at 1815 and instruction conversion terminates. If the stack entries of each input stack have equivalent types, at 1805 a determination is made regarding whether any stack entries have a smaller type than corresponding entries in other input stacks. By way of example, a stack entry of type "short" is smaller than a stack entry of type "int". If any stack entries have a smaller type than corresponding entries in other input stacks, the operand type for the input instruction is changed to the larger type at 1810. Using the above example, the "short" stack entry would be changed to an "int" stack entry.

Figure 19:
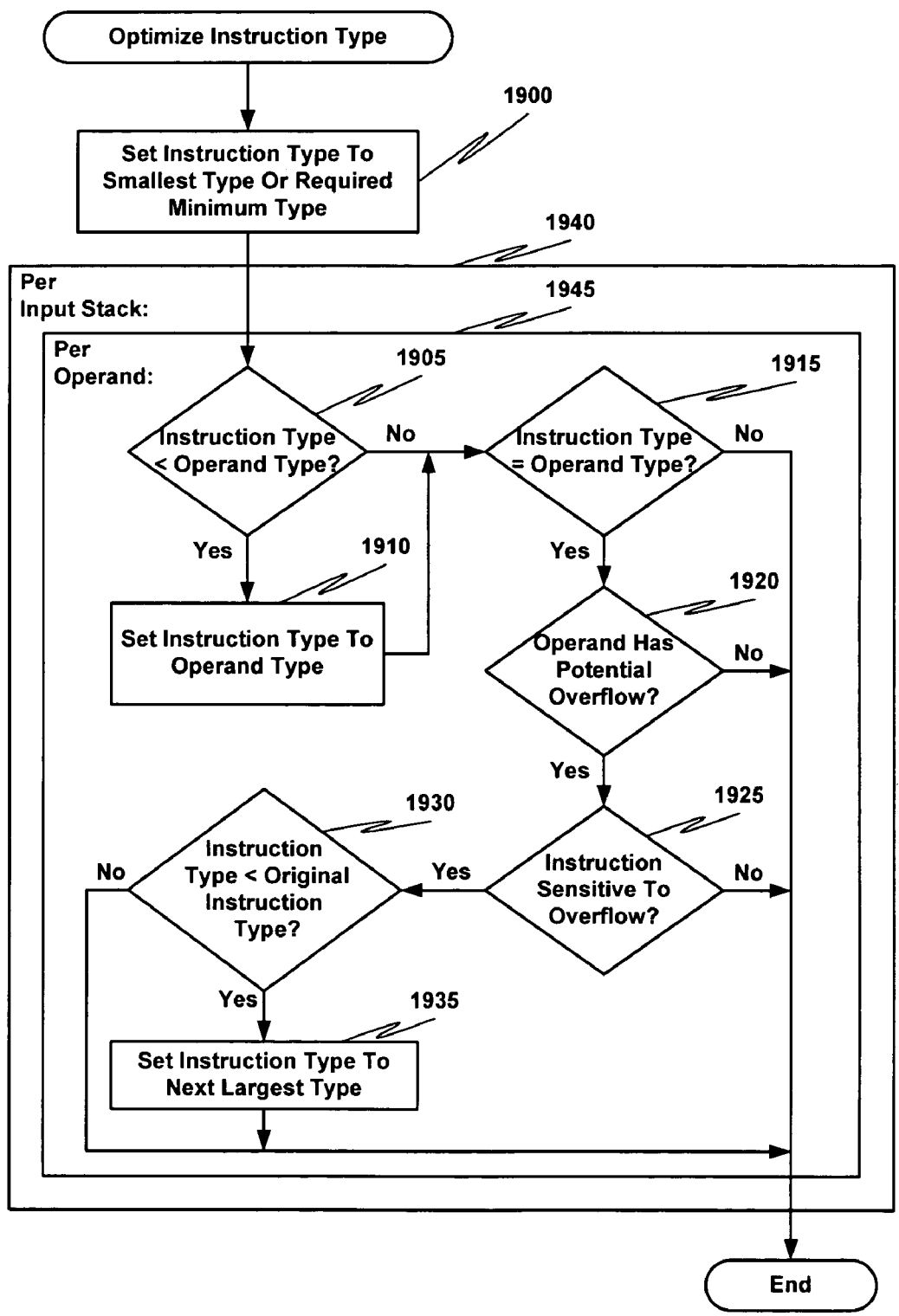
FIG. 19 is a flow diagram that illustrates a method for optimizing an instruction type in accordance with one embodiment of the present invention.

Turning now to FIG. 19, a flow diagram that illustrates a method for optimizing an instruction type in accordance with one embodiment of the present invention is presented. FIG. 19 provides more detail for reference numeral 1625 of FIG. 16. At 1900, if a required minimum type has been set, the instruction type is set to the required minimum type. Otherwise, the instruction type is set to the smallest usable type. By way of example, if the original instruction is "iadd"

which requires operands of type "int", the instruction type is set to "short" and the corresponding instruction is "sadd". Block 1940 is performed per input stack and block 1945 is performed per operand in an input stack. The operand processing begins at 1905, where a determination is made regarding whether the instruction type that was set at 1900 is less than the operand type. By way of example, if the instruction type is "short" and the operand type is "int", the instruction type is less than the operand type. If the instruction type is less than the operand type, at 1910 the instruction type is set to the operand type. Using the above example, the instruction type is set to "int" and the corresponding instruction is "iadd". If the instruction type is greater than or equal to the operand type, at 1915 a determination is made regarding whether the instruction type is the same as the operand type. By way of example, if the instruction type is "int" and the operand type is "int", the instruction type is the same as the operand type. If the instruction type is greater than the operand type or if the operand has no potential overflow or if the operand has potential overflow but the instruction is insensitive to overflow, no optimization is performed. An operand may carry potential overflow if it was created by one of the operators listed in Table 1, or if it is created by an operator that propagates overflow in an operand. Operators that propagate overflow include, by way of example, the "and", "or" and exclusive "or" (xor) operators.

Still referring to FIG. 19, if the instruction type is equal to the operand type (1915) and the operand has potential overflow (1920) and the instruction is sensitive to overflow (1925), at 1930 a determination is made regarding whether the instruction type is less than the original (before conversion) instruction type. The Java™ bytecodes that are sensitive to overflow are listed in Table 2. Those of ordinary skill in the art will recognize that the list of operators affected by overflow may vary for different high-level languages, and that this invention may be applied to these other languages as well. If the instruction type is less than the original instruction type, the instruction type is set to the next larger type (1935). By way of example, if the instruction type is "short" and the original instruction type is "int", the instruction type is set to "int". If the instruction type is not less than the original instruction type, no optimization is performed.

Figure 20:
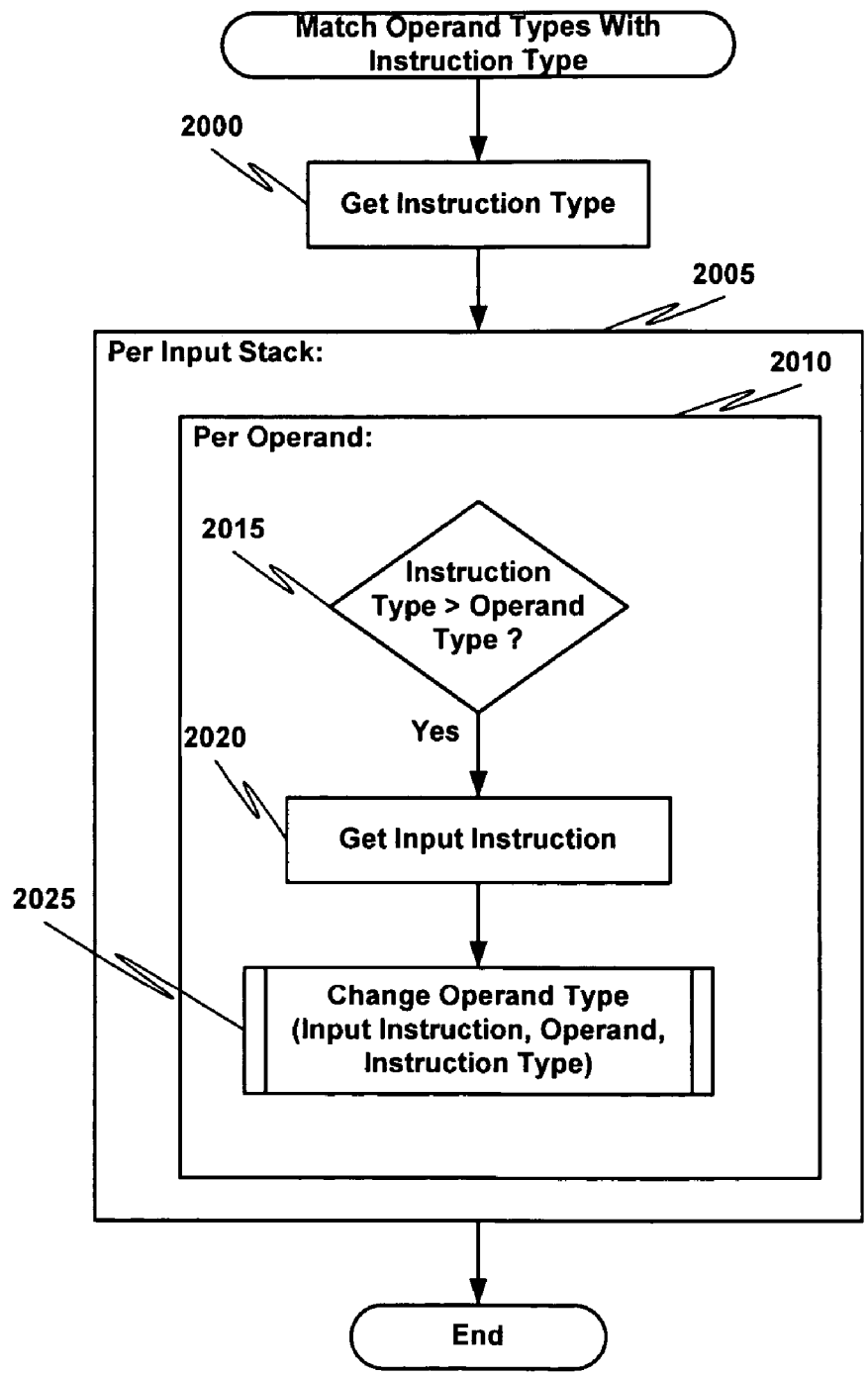
FIG. 20 is a flow diagram that illustrates a method for matching operand types with an instruction type in accordance with one embodiment of the present invention.

Turning now to FIG. 20, a flow diagram that illustrates a method for matching operand types with an instruction type in accordance with one embodiment of the present invention is presented. FIG. 20 provides more detail for reference numeral 1630 of FIG. 16. At 2000, the instruction type is received. Block 2005 is repeated per input stack associated with the instruction and block 2010 is repeated per operand in an input stack. Operand processing begins at 2010, where a determination regarding whether the instruction type is greater than the operand type is made. If the instruction type is greater than the operand type, the input instruction that generates the operand is received at 2020 and at 2025 the operand type of the input instruction is changed to the instruction type that was received at 2000.

Figure 21:
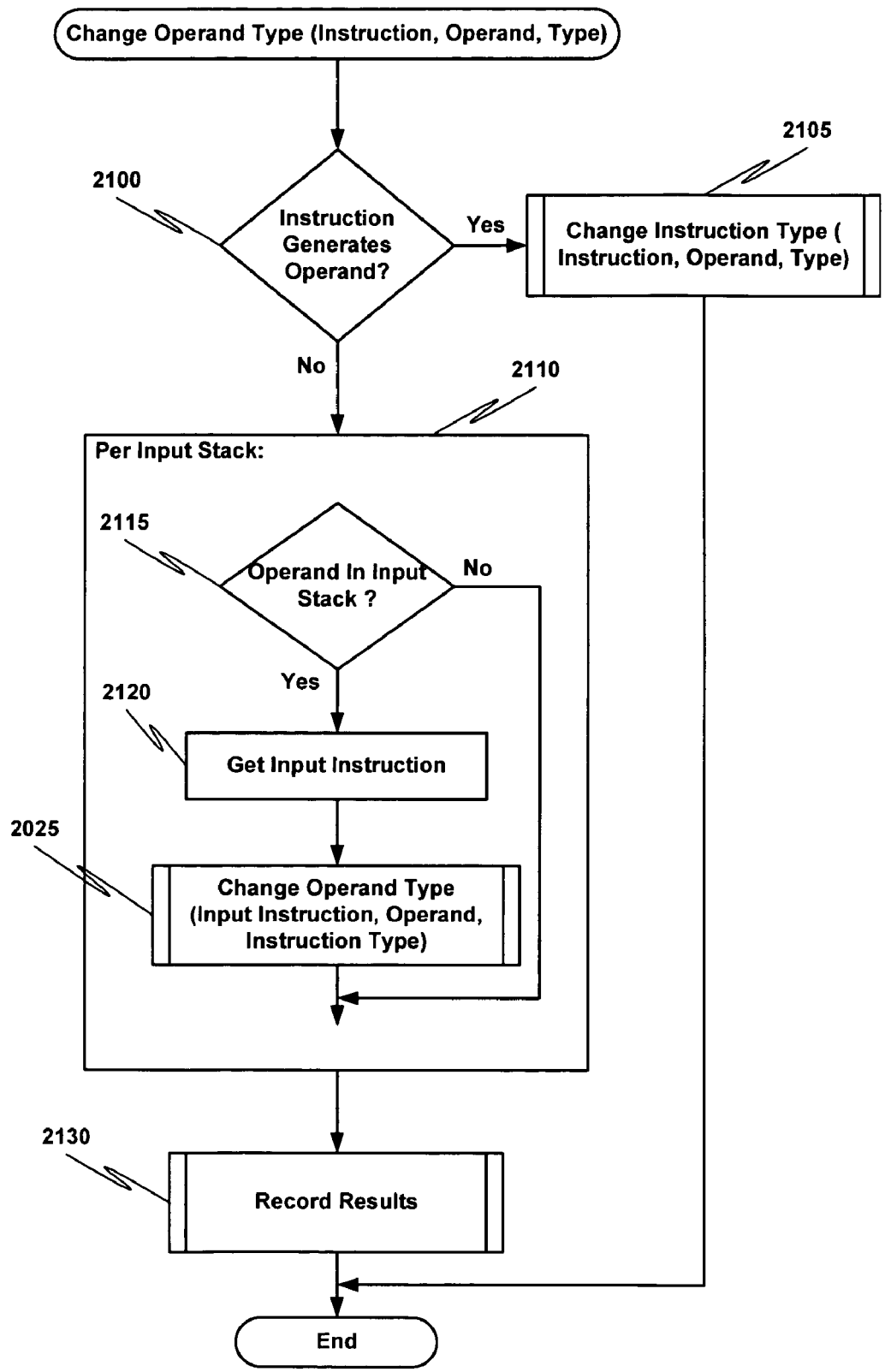
FIG. 21 is a flow diagram that illustrates a method for changing an operand type in accordance with one embodiment of the present invention.

Turning now to FIG. 21, a flow diagram that illustrates a method for changing an operand type in accordance with one embodiment of the present invention is presented. FIG. 21 provides more detail for reference numeral 2025 of FIG. 20 and reference numeral 1810 of FIG. 18. This method is used to recursively follow the chain of operand creation to change the origin of a smaller type and all of its subsequent instructions to a larger type. At 2100, a determination is made regarding whether a received instruction generates a received operand. An instruction generates an operand if execution of the instruction results in creation of the operand. If the instruction generates the operand, the instruction type of the received instruction is changed to a received type at 2105. If the instruction does not generate the operand, the operand type for each input instruction of the received instruction is recursively changed to the received type at 2110. At 2130, the results are recorded.

Figure 22:
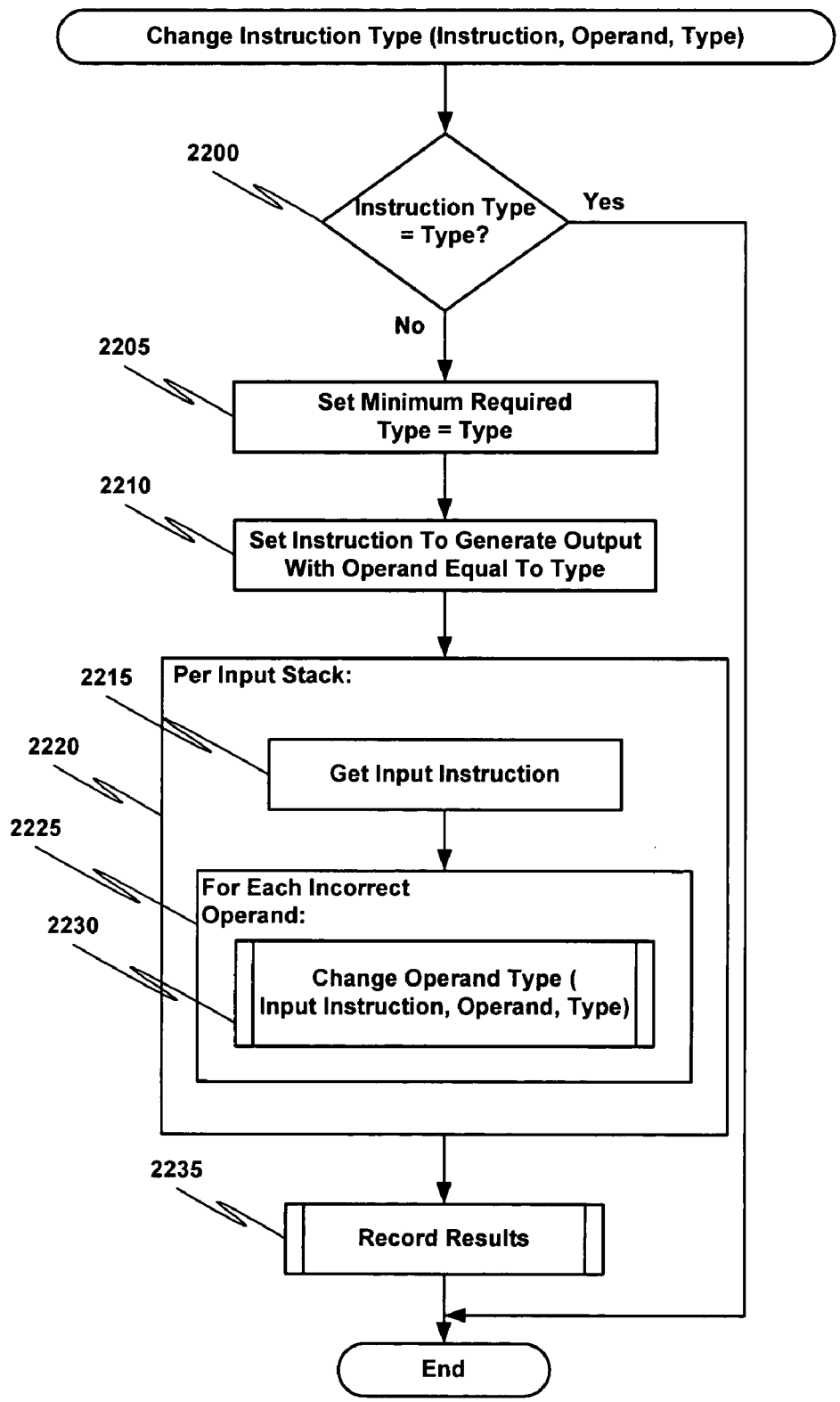
FIG. 22 is a flow diagram that illustrates a method for changing an instruction type in accordance with one embodiment of the present invention.

Turning now to FIG. 22, a flow diagram that illustrates a method for changing an instruction type in accordance with one embodiment of the present invention is presented. FIG. 22 provides more detail for reference numeral 2105 of FIG. 21. At 2200, a determination is made regarding whether the instruction type of a received instruction equals a received type. If the instruction type of the received instruction is not the same as the received type, the minimum required type is set to the received type at 2205. The minimum required type may be used to force a minimum type in subsequent instruction conversions. At 2210, the instruction type of the received instruction is set to generate output with the operand equal to the received type.

Still referring to FIG. 22, block 2220 is repeated per input stack associated with the instruction. At 2215, the input instruction associated with a particular input stack is received. Block 2225 is repeated per incorrect operand in the input stack. At 2230, the operand type of an incorrect operand is changed to the required minimum type set at 2205. At 2235, the results are recorded.

Figure 23:
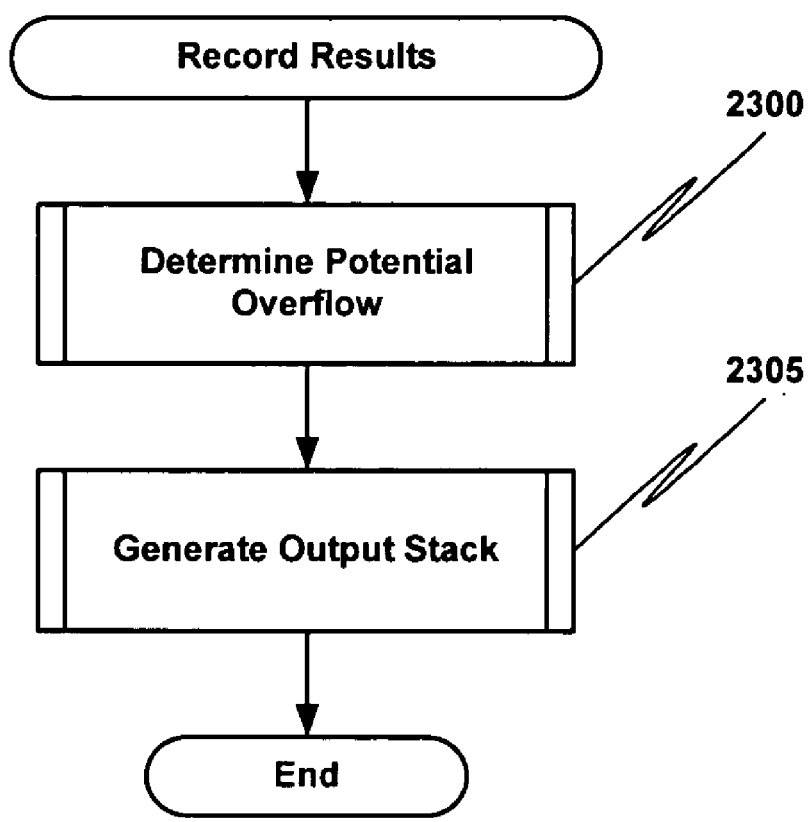
FIG. 23 is a flow diagram that illustrates a method for recording results in accordance with one embodiment of the present invention.

Turning now to FIG. 23, a flow diagram that illustrates a method for recording results in accordance with one embodiment of the present invention is presented. FIG. 23 provides more detail for reference numeral 1635 of FIG. 16, reference numeral 2115 of FIG. 21 and reference numeral 2235 of FIG. 22. At 2300, potential overflow generated by the current instruction is determined. At 2305, an output stack is generated.

Figure 24A:
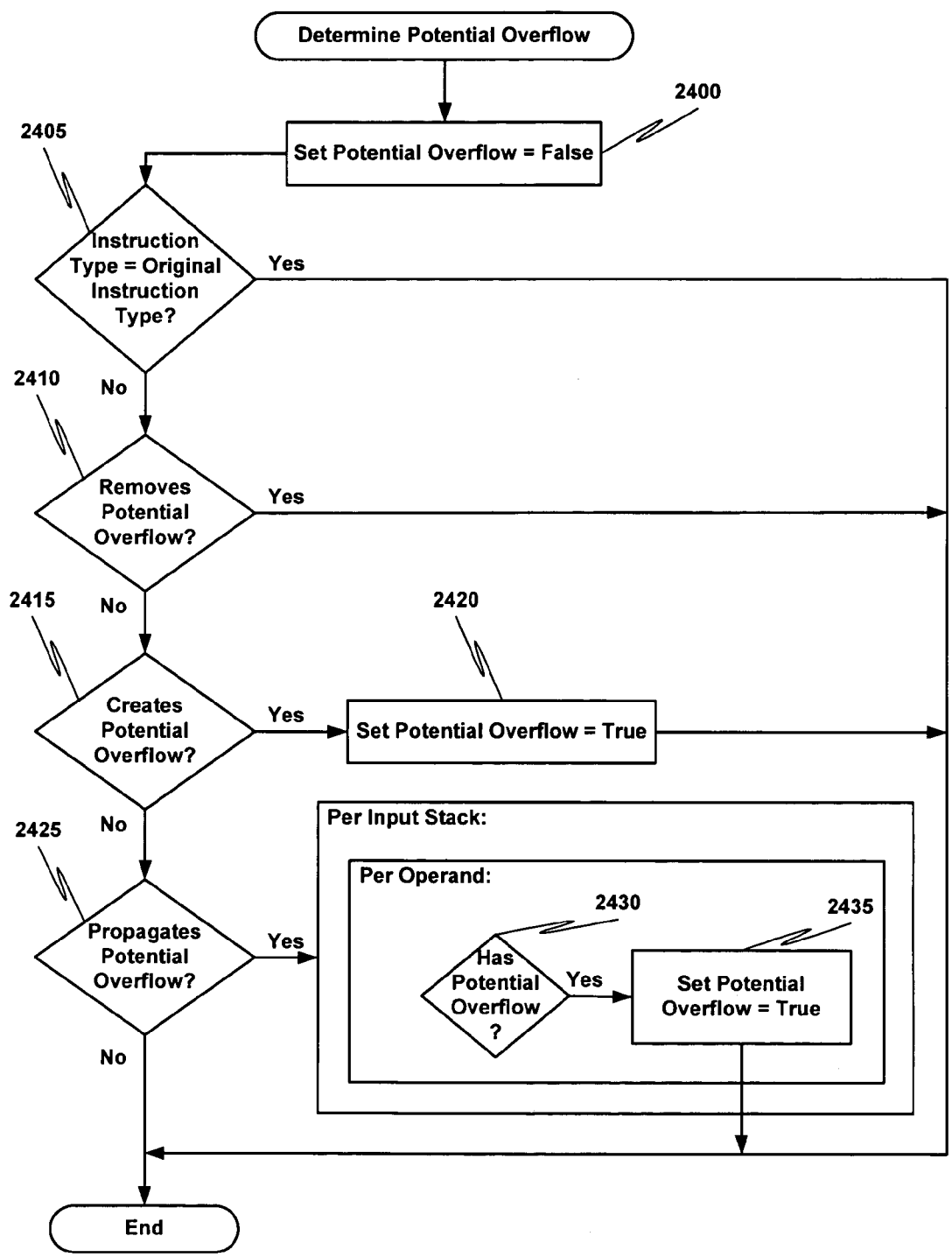
FIG. 24A is a flow diagram that illustrates a method for determining potential overflow in accordance with one embodiment of the present invention.
Figure 24B:
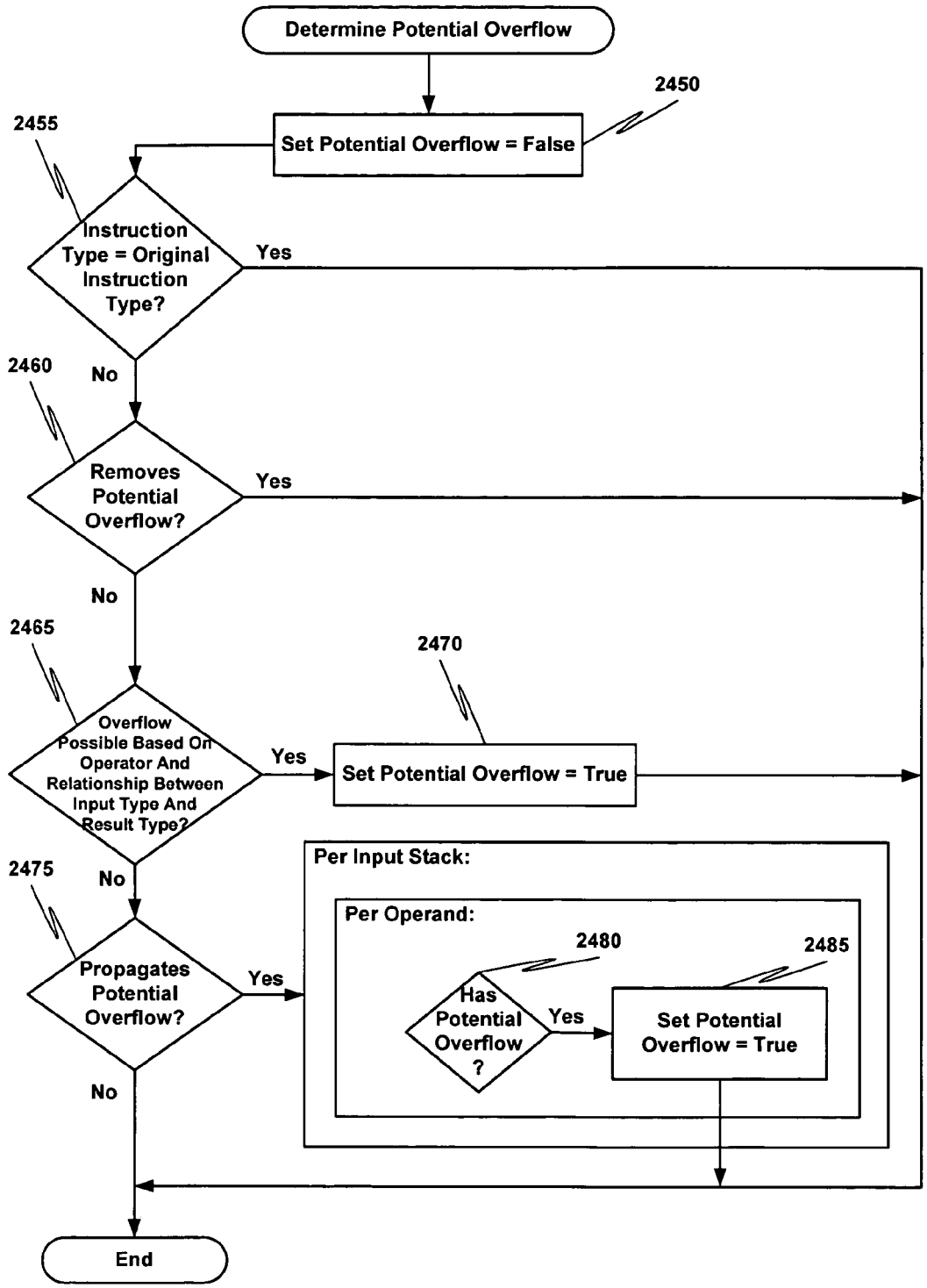
FIG. 24B is a flow diagram that illustrates a method for determining potential overflow in accordance with one embodiment of the present invention.

FIGS. 24A and 24B illustrate methods for determining potential overflow in accordance with embodiments of the present invention. FIG. 24A examines the instruction to determine whether it creates potential overflow based on the type of operation, whereas FIG. 24B is a further optimization that determines whether overflow is possible based on the operation and the relationship between the input type and the result type.

Turning now to FIG. 24A, a flow diagram that illustrates a method for determining potential overflow in accordance with one embodiment of the present invention is presented. FIG. 24A provides more detail for reference numeral 2300 of FIG. 23. At 2400, a flag that indicates the potential for overflow is initialized to "false". The flag is set to "true" if the instruction type of the converted instruction is not the same as the original instruction type (2405) before conversion, if the instruction does not remove potential overflow (2410) and if the instruction creates potential overflow (2415). Operators with a potential to create overflow are shown in Table 1. If the instruction does not create potential overflow but instead propagates potential overflow (2425), the flag is set to "true" (2435) if any operand on any input stack associated with the instruction has potential overflow (2430).

Turning now to FIG. 24B, a flow diagram that illustrates a method for determining potential overflow in accordance with one embodiment of the present invention is presented. FIG. 24B is similar to FIG. 24A except that FIG. 24A examines the instruction to determine whether it creates potential overflow (2415), whereas FIG. 24B determines whether overflow is possible based on the operation and the relationship between the input type and the result type (2465). The Java Card™ result types and overflow indications returned are summarized in tables 3 to 10, below. The tables are organized according to the type of instruction. Each table indicates the result type and the overflow indication based upon the types of one or two operands.

TABLE 3

Addition, Multiplication, and Subtraction

| type(A) | and/or | type(B) | Result Type | Overflow |
|---|---|---|---|---|
| byte | and | byte | short | false |
| int | or | int | int | false |
| others | | | short | true |

TABLE 4

Division

| type(A) | and/or | type(B) | Result Type | Overflow |
|---|---|---|---|---|
| byte | and | byte | short | false |
| byte | and | short | short | false |
| int | or | int | int | false |
| others | | | short | true |

TABLE 5

Left Shift

| type(A) | Result Type | Overflow |
|---|---|---|
| byte | short | true |
| short | short | true |
| int | int | false |

TABLE 6

Right Shift

| type(A) | Result Type | Overflow |
|---|---|---|
| byte | byte | false |
| short | short | false |
| int | int | false |

TABLE 7

Negate

| type(A) | Result Type | Overflow |
|---|---|---|
| byte | short | false |
| short | short | true |
| int | int | false |

TABLE 8

Unsigned Right Shift

| type(A) | Result Type | Overflow |
|---|---|---|
| byte | short | true |
| short | short | true |
| int | int | false |

TABLE 9

Remainder

| type(A) | and/or | type(B) | Result Type | Overflow |
|---|---|---|---|---|
| int | or | int | int | false |
| others | | | short | false |

TABLE 10 and, or, xor

| type(A) | and/or | type(B) | Result Type | Overflow |
|---|---|---|---|---|
| byte | and | byte | byte | false |
| int | or | int | int | false |
| others | | | short | =overflow(operands) |

Suppose the operation of the instruction being converted is 16-bit integer addition ("sadd" in Java Card™ technology). According to Table 3, if both inputs to the addition operation are of type "byte", no overflow results from the operation. No overflow is results in this case because while adding two 8-bit "byte" values may overflow an 8-bit "byte" result, the same addition cannot overflow a 16-bit "short" result.

Although Tables 3–10 illustrate the use of Java Card™ result types and overflow indications, the invention may be applied to other computer languages having a similar size relationship between integer types. In more detail, the invention is applicable to any computer language supporting two or more integer types of different sizes. By way of example, the invention is applicable to a computer language supporting four integer types, wherein the size of a first integer type is less than the size of a second integer type, the size of the second integer type is less than the size of a third integer type and the size of the third integer type is less than the size of a fourth integer type. As an additional example, the invention is applicable to a computer language supporting three integer types, wherein the size of a first integer type is half the size of a second integer type and wherein the size of the second integer type is half the size of a third integer type.

Figure 25:
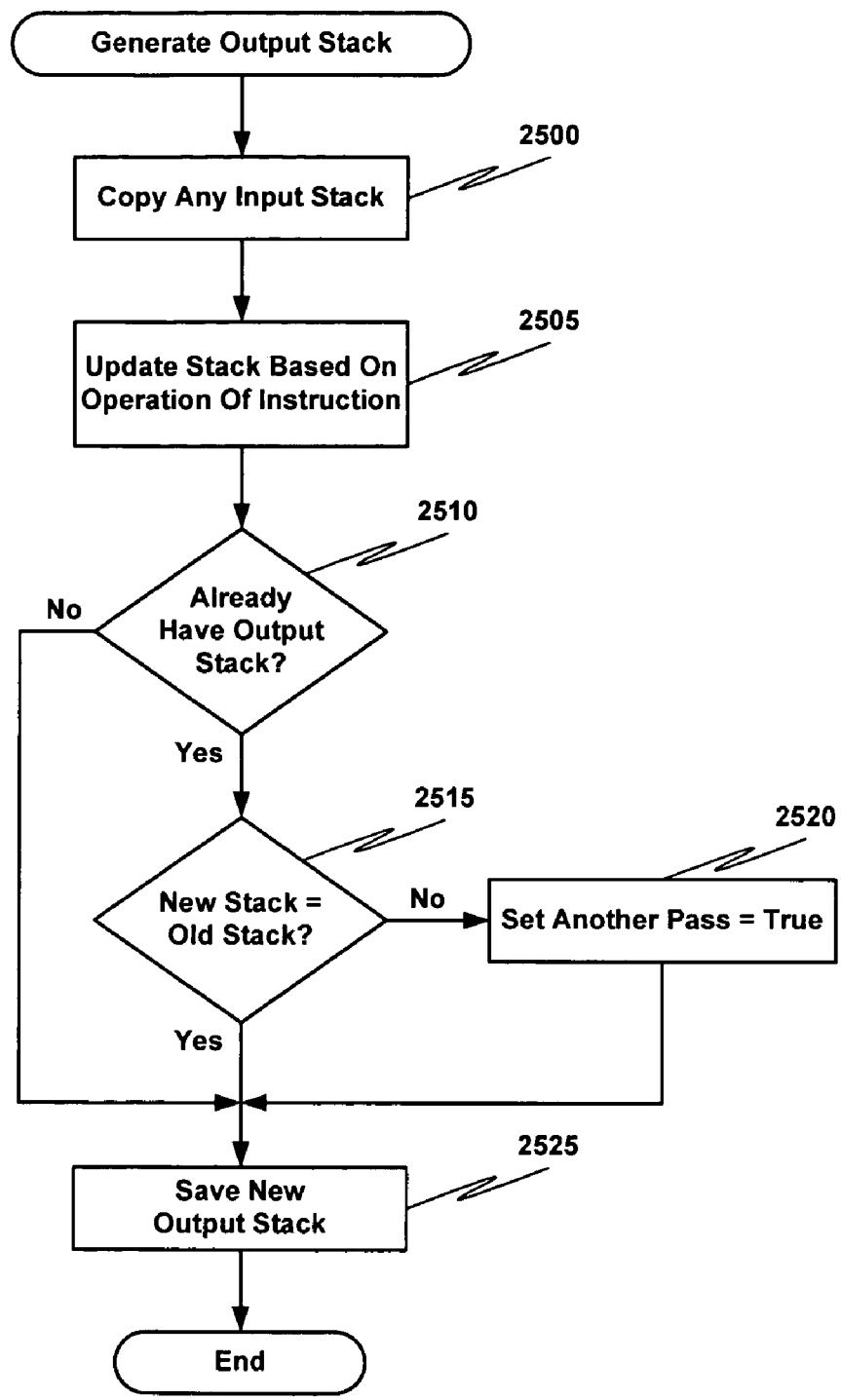
FIG. 25 is a flow diagram that illustrates a method for generating an output stack in accordance with one embodiment of the present invention.

Turning now to FIG. 25, a flow diagram that illustrates a method for generating an output stack in accordance with one embodiment of the present invention is presented. FIG. 25 provides more detail for reference numeral 2305 of FIG. 23. At 2500, any input stack is copied. At 2505, the stack is updated based on the operation of the instruction. By way of example, before performing an "iadd" operation, the corresponding input stack will have at least two operands on the stack. The "iadd" instruction removes the top two stack entries, adds them and puts the result (which has the same type as the two operands) on the stack. Thus in this example, at 2505 the two stack entries representing the two operands are replaced with one entry representing the result of the "iadd" operation. At 2510, a determination is made regarding whether an output stack for the instruction already exists. If an output stack for the instruction already exists, at 2515 a determination is made regarding whether the new stack is the same as the existing stack. If the new stack is not the same as the existing stack, at 2520 an indication that another conversion pass is required is made. This ensures that consumers of the instruction are updated based on the new results. At 2525, the new output stack is saved, replacing any existing output stack.

FIGS. 26–32 are block diagrams that illustrate applying methods of the present invention to various code segments. While the algorithms disclosed herein describe conversion of a method or procedure, the provided examples describe conversion of an expression or code segment. Additional details related to processing the provided examples in the context of a method or procedure will be apparent to those of ordinary skill in the art.

Figure 29:
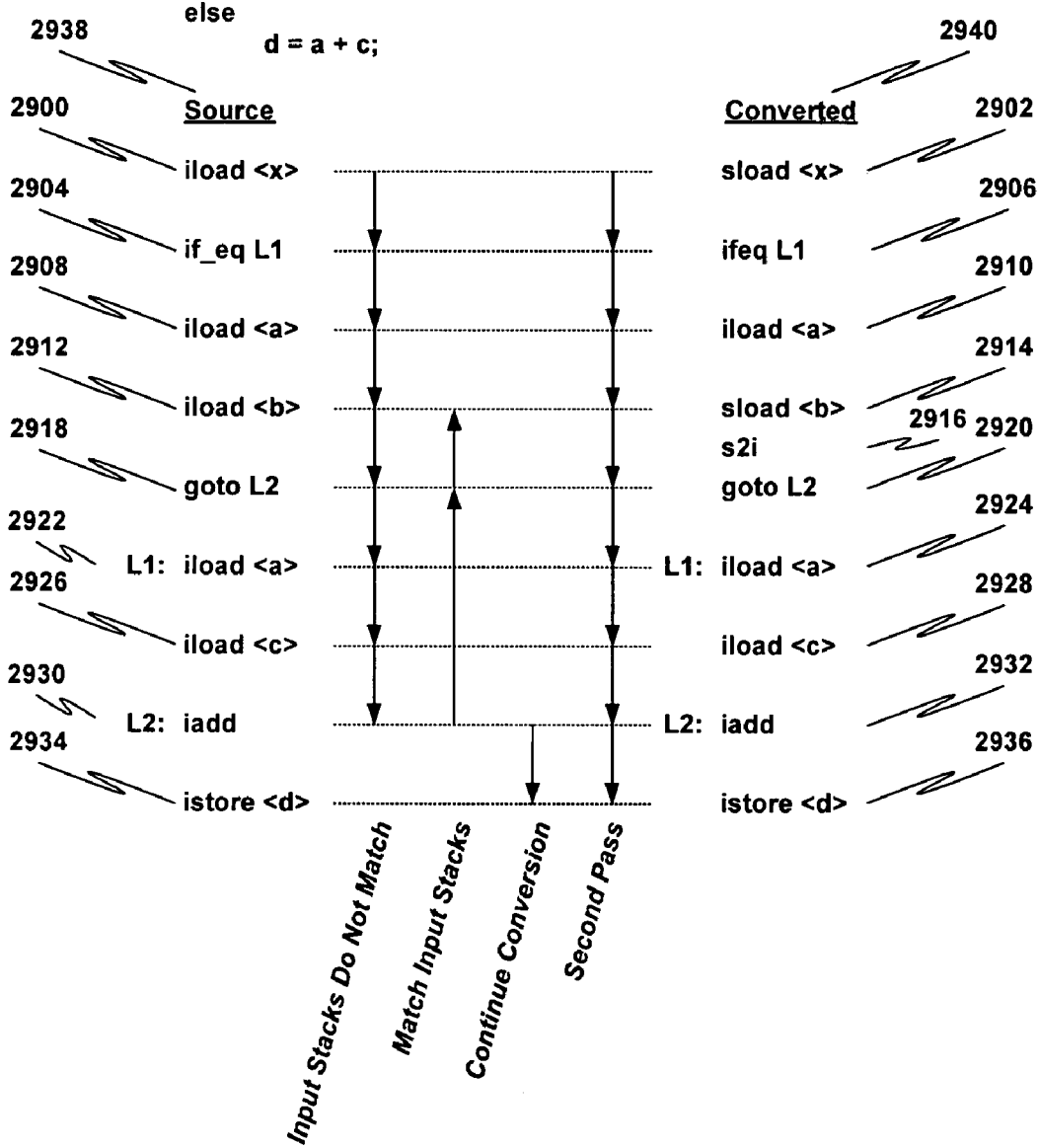
FIG. 29 is a block diagram that illustrates instruction conversion where input stacks do not match in accordance with one embodiment of the present invention.
Figure 30:
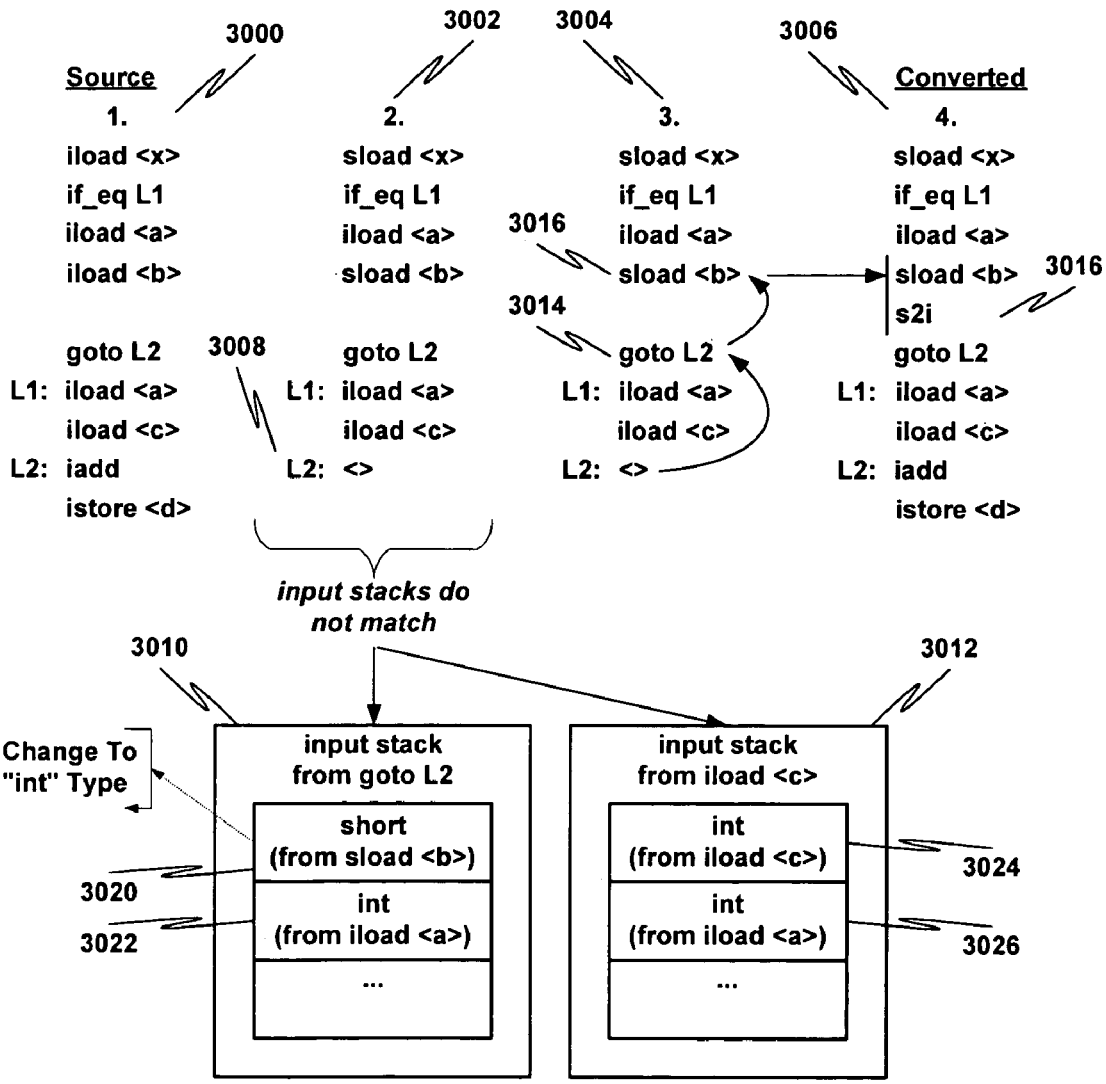
FIG. 30 is a detailed block diagram that illustrates instruction conversion where input stacks do not match in accordance with one embodiment of the present invention.
Figure 31:
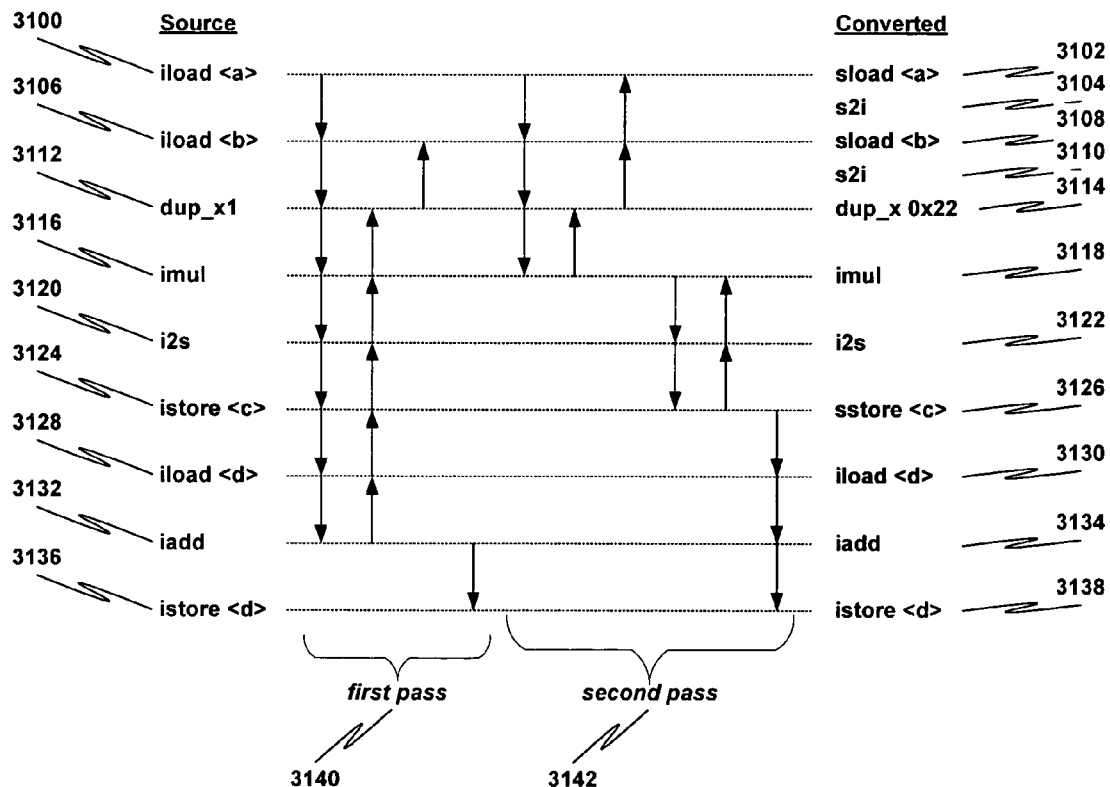
FIG. 31 is a block diagram that illustrates conversion of an instruction that has multiple consumers in accordance with one embodiment of the present invention.
Figure 32:
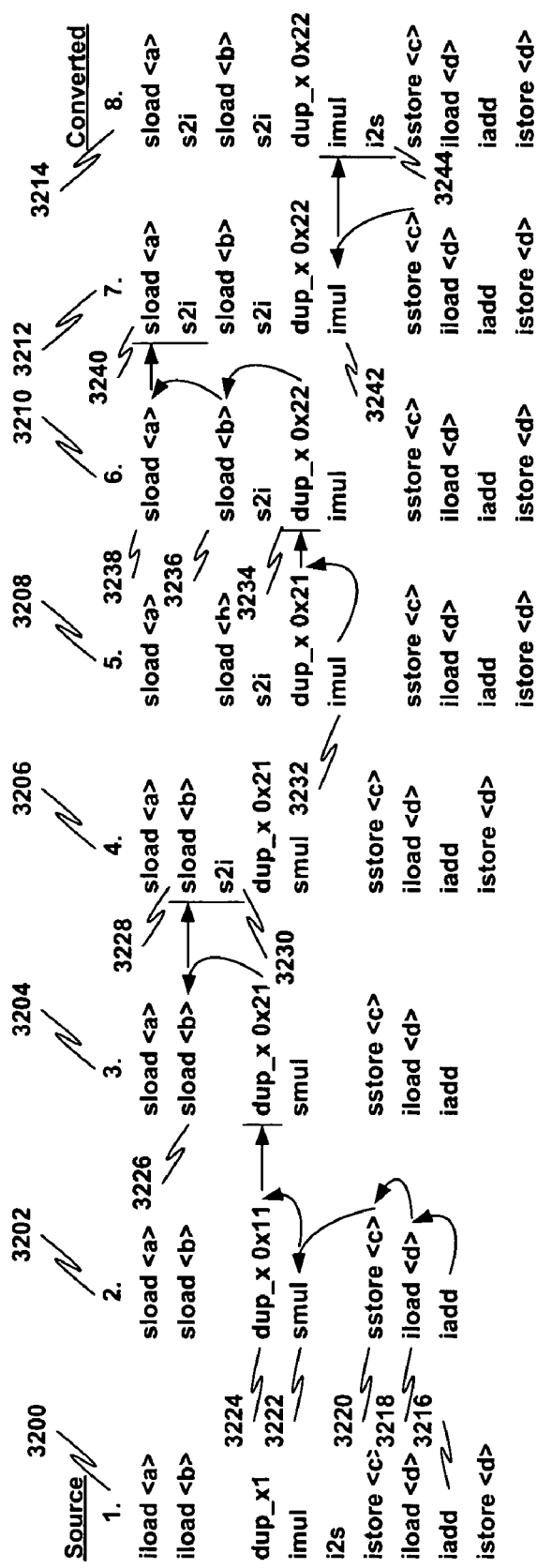
FIG. 32 is a detailed block diagram that illustrates conversion of an instruction that has multiple consumers in accordance with one embodiment of the present invention.

The examples illustrated in FIGS. 26–32 demonstrate application of the present invention in optimizing an expression to smaller type instructions (FIG. 26), handling an expression that cannot be optimized to smaller type instructions (FIGS. 27–28), converting an instruction with multiple input stacks (FIGS. 29–30) and converting an instruction with multiple consumer instructions (FIGS. 31–32).

The examples illustrated in FIGS. 26–32 demonstrate application of the present invention within the context of Java™ and Java Card™ technology. As such, Java™ bytecode is optimized into Java Card™ bytecode. Those of ordinary skill in the art will recognize that the invention may be applied to other computer languages.

Figure 26:
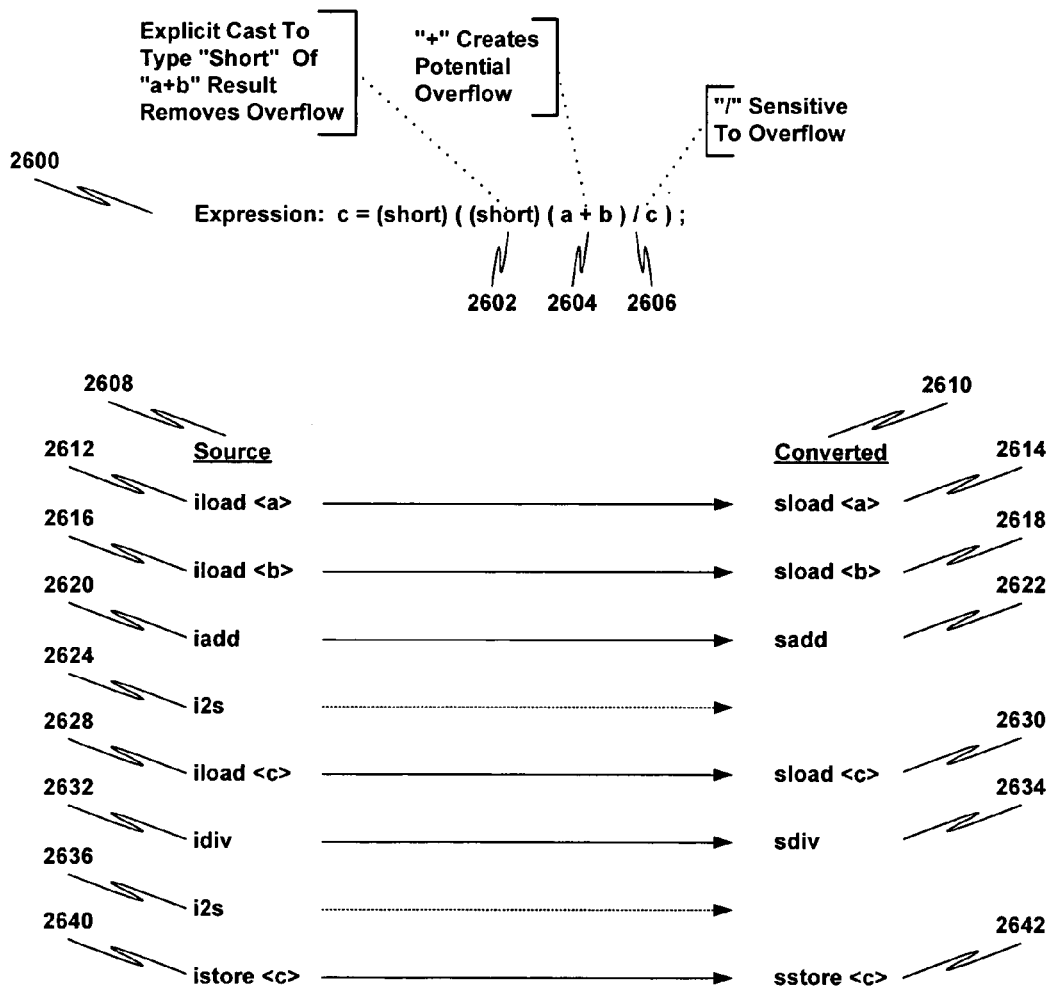
FIG. 26 is a block diagram that illustrates conversion of an arithemetic expression that can be optimized to smaller type instructions in accordance with one embodiment of the present invention.

Turning now to FIG. 26, a block diagram that illustrates conversion of an arithemetic expression that can be optimized to smaller type instructions in accordance with one embodiment of the present invention is presented. In FIG. 26, the conversion process is applied to the Java™ expression $$c=(short)((short)(a+b)/c)$$

where the values "a", "b" and "c" are of type "short". The Java™ bytecode sequence for this expression is shown at reference numeral 2608.

Instruction conversion begins with the source Java™ bytecode shown at reference numeral 2608, processing each instruction in sequence. The results of optimizing are shown in Java Card™ bytecodes at reference numeral 2610. Beginning with the first instructions, the "iload <a>" instruction (2612) and "iload <b>" instruction (2616) both operate on local variables, "a" and "b", declared as type "short". Therefore, these instructions are optimized to the Java Card™ load instructions of type "short" as shown at reference numerals 2614 ("sload <a>") and 2618 ("sload <b>"). Because the "sload <a>" and "sload <b>" inputs to the "iadd" instruction at reference numeral 2620 are both type "short", the "iadd" instruction is optimized to the Java Card™ type short add bytecode "sadd", as shown at reference numeral 2622. The "i2s" instruction at reference numeral 2624 converts an "int" value to a "short" value in the Java™ bytecode. Because the Java Card™ "sadd" instruction (2622) already outputs a "short" value, this conversion instruction is not needed in the result bytecode. In addition, as specified in Table 1, the addition instruction creates overflow, but the subsequent bytecode "i2s" (2628) removes the potential overflow. Therefore, the "sadd" output of the Java Card™ bytecode does not contain potential overflow. The "iload <c>" instruction (2628) is converted to the "sload <c>" instruction (2630) for the same reason described above. The inputs to the "idiv" instruction (2632) are the "sadd" instruction (2622) and the "sload <c>" instruction (2630). Since both of these inputs render short type results, the "idiv" instruction (2632) is optimized to the "sdiv" instruction (2634). The "sdiv" instruction (2632) is sensitive to overflow as indicated in Table 2, however neither inputs ("sadd" where the original Java™ bytecode contained an explicit cast to "short", and "sload <c>") contain potential overflow. The "i2s" instruction at reference numeral 2636 is discarded for the same reason as the "i2s" instruction at reference numeral 2624. Finally, the "istore <c>" instruction at reference numeral 2640 is optimized to the "sstore <c>" instruction at reference numeral 2642 for the same reasons as described above for other local variables.

To further aid in an understanding of the present invention, the example illustrated in FIG. 26 and discussed above will now be described in more detail, with reference to FIGS. 14–26. Referring to FIG. 14, an initial stack is created at 1400. The initial stack for the first instruction 2612 comprises entries for variables "a", "b" and "c". The initial stack may also comprise one or more local variables and one or more parameters. At 1405, input instructions are recorded. Instructions 2612, 2616, 2620, 2624, 2628, 2632 and 2636 are input instructions with respect to instructions 2616, 2620, 2624, 2628, 2632, 2636 and 2640, respectively. At 1410, a flag that indicates whether another conversion pass is required is initialized to "false". At 1415, the first instruction ("iload <a>" 2612) is obtained. At 1420, the "iload <a>" instruction 2612 is converted to the "sload <a>" instruction 2614. The remaining instructions 2616, 2620, 2624, 2628, 2632, 2636 and 2640 are converted at 1420. After all instructions have been converted, the flag that indicates whether another conversion pass is required will be "False" as demonstrated in the description below, thus ending the method conversion process.

Referring to FIG. 16, conversion of the first instruction ("iload <a>" 2612 of FIG. 26) begins with obtaining the input stack. At 1605 the input stack is not empty since it contains at least the local variables "a", "b" and "c", so the input stack is validated at 1615. At 1625, the "iload <a>" instruction type is optimized as illustrated in FIG. 19. At 1900, the instruction type is set to the smallest usable type ("short") because the variable "a" is type "short". The corresponding instruction is "sload <a>".

Referring again to FIG. 16, at 1630 the operand types are matched with the instruction type as illustrated in FIG. 20. The "sload" instruction has no operands, so there is nothing to match at 1630. At 2000, the "sload" instruction type ("short") is obtained.

Referring again to FIG. 16, at 1635 the conversion results are recorded as illustrated in FIG. 23. At 2300, potential overflow is determined. Potential overflow may be determined as illustrated in FIG. 24A. At 2400, a "potential overflow" flag is set to "false". At 2405 the "sload <a>" instruction type ("short") does not equal the original instruction type ("int"), at 2410 the "sload" instruction does not remove potential overflow, at 2415 "sload" instruction does not create potential overflow and at 2425 the "sload" instruction does not propagate potential overflow. Thus, the "potential overflow" flag remains "false". The operand does not propagate potential overflow at 2425 because the operand was loaded directly from a local variable and thus was not created by an operation that creates overflow. At 2305, an output stack is generated as illustrated in FIG. 25.

Alternatively, potential overflow may be determined as illustrated in FIG. 24B. At 2465, overflow is not possible based on the operator ("sload") and the relationship between the input type ("short") and the result type ("short").

Referring to FIG. 25, at 2505 the input stack is updated based upon operation of the "sload" instruction. The "sload" instruction loads a "short" value and places it on the stack, so an entry representing a "short" value is placed on the input stack.

The "iload <b>" instruction (reference numeral 2616 of FIG. 26) is processed in a manner similar to that of the "iload "<a>" instruction 2612, resulting in an "sload <b>" instruction 2618 and an input stack with two short-type entries: One entry representing the "sload <a>" result and one entry representing the "sload <b>" result.

Next, the "iadd" instruction (reference numeral 2620 of FIG. 26) is processed. Referring to FIG. 16, the input stacks are validated at 1615. There is only a single input stack, so reference number 1700 is skipped. Since at 1710 the "iadd" instruction takes two operands and there are two operands on the stack ("sload <a>" result and "sload <b>" result) and since at 1715 the two stack entries represent integer types, an indication that the input stack has been successfully validated is made at 1720.

Referring again to FIG. 16, the "iadd" instruction type ("int") is optimized at 1625. At 1900, the instruction type is set to the smallest usable type ("short"). The corresponding instruction is "sadd". The following checks are performed for both the "sload <a>" result and "sload <b>" result operands. At 1905 and 1915, the "sadd" instruction type ("short") equals the operand type ("short"). At 1920, the operand (both "sload <a>" result and "sload <b>" result) was loaded directly from a local variable so it does not have potential overflow, and optimization of the instruction ends.

Referring again to FIG. 16, the operand types are matched at 1630. For both the "sload <a>" result and "sload <b>" result operands, at 2015 the instruction type ("sadd") is not greater than the operand type ("short"), so validation of the operand types ends.

Referring again to FIG. 16, the results are recorded at 1635. Referring to FIG. 23, at potential overflow is determined at 2300. The Java Card™ result types and overflow indications returned are summarized in tables 3 to 10, above.

Referring again to FIG. 23, potential overflow is determined at 2300. Because according to Table 3 the "sadd" instruction creates potential overflow, an indication that the result has potential overflow is made at reference numeral 2420 of FIG. 24A. At 2305, the output stack is generated. At 2505, the input stack is updated to remove the "short"-type entries representing the "sload <a>" result and "sload <b>" result and replaced with a "short"-type entry representing the "sadd" result.

Next, the "i2s" instruction (reference numeral 2624 of FIG. 26) is processed. The "i2s" instruction is a type conversion instruction. At reference numeral 1900 of FIG. 19, the instruction type is set to the smallest usable type. Since both the operand type ("short") and the instruction type are the same, potential overflow is eliminated, obviating the need for a type conversion instruction.

Next, the "iload <c>" instruction (reference numeral 2628 of FIG. 26) is processed. Like values "a" and "b", "c" is of type "short" and the "iload <c>" instruction is converted to an sload <c> instruction. Next, the "idiv" instruction is processed. As specified in Table 2, "idiv" is an instruction that may be affected by overflow. The "a+b" result operand does not carry potential overflow due to the explicit source-level cast to "short" (2602), so the optimized divide instruction type is determined to be type "short" at reference numeral 1900. The corresponding instruction is "sdiv".

Next, the second "i2s" instruction (reference numeral 2636 of FIG. 26) is processed. At reference numeral 1900 of FIG. 19, the instruction type is set to the smallest usable type. Since both the operand type ("short") and the "i2s" instruction type ("short") are the same, potential overflow is eliminated, obviating the need for a type conversion instruction.

Finally, the "istore <c>" instruction (reference numeral 2640 of FIG. 26) is processed. Since the minimum type is type "short" and the input from "sdiv" does not carry overflow, the "istore <c>" instruction 2640 is optimized to a "sstore <c>" instruction 2642 at reference numeral 1900 of FIG. 19. The converted bytecodes are shown at reference numeral 2610 of FIG. 26.

Figure 28:
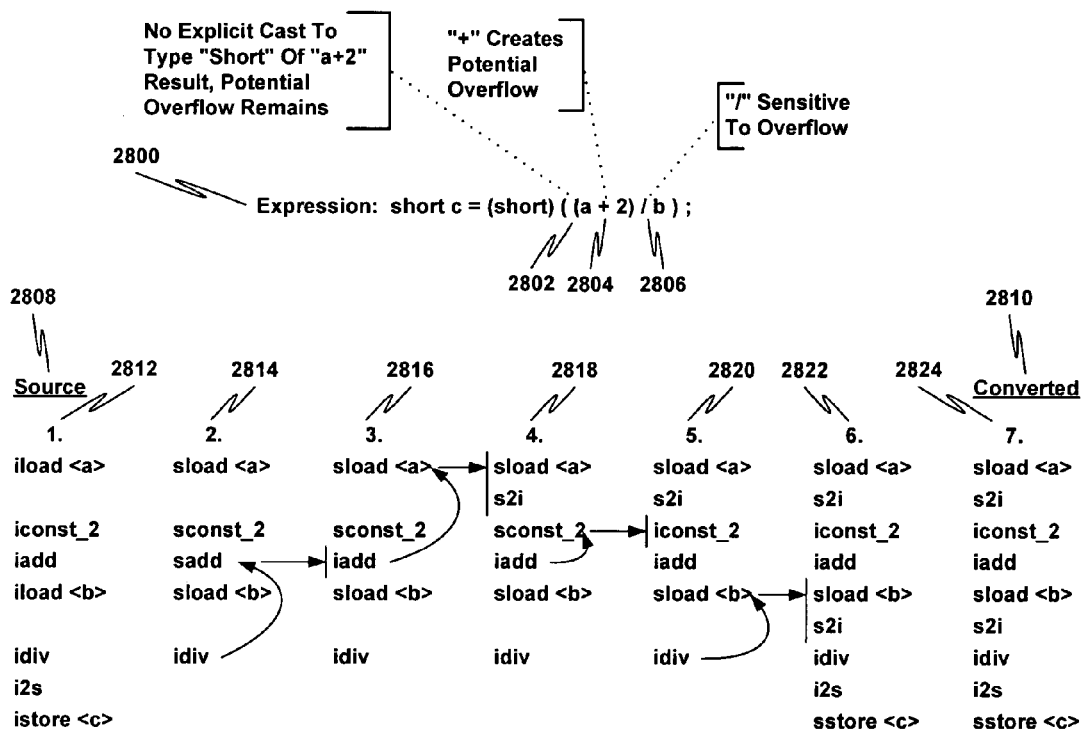
FIG. 28 is a detailed block diagram that illustrates conversion of an arithemetic expression that cannot be optimized to smaller type instructions in accordance with one embodiment of the present invention.

FIGS. 27 and 28 describe the same example with different levels of detail. FIG. 27 illustrates at a high level the conversion of an arithmetic expression that cannot be optimized to smaller type instructions. FIG. 28 illustrates the same conversion in more detail.

Turning now to FIG. 27, a high-level block diagram that illustrates conversion of an arithmetic expression that cannot be optimized to smaller type instructions in accordance with one embodiment of the present invention is presented. FIG. 27 illustrates the conversion process for the Java™ expression $$c=(\text{short})((a+2)/b)$$

where the values "a", "b" and "c" are of type "short". The Java™ bytecode sequence for this expression is shown at reference numeral 2708. Note that expression 2700 of FIG. 27 is similar to expression 2600 of FIG. 26 except that the result of the addition operation is explicitly cast to "short" (2602) in expression 2600, whereas expression 2700 is not explicitly cast. Conversion of expression 2700 proceeds in a manner similar to the conversion of expression. 2600 until conversion of the "idiv" instruction 2732. At this point, the input stack comprises entries for the "sload <b>" result and the "sadd" result (a+2). Value "b" was loaded directly from a local variable via the "sload <b>" instruction 2728 and thus does not carry potential overflow. The "sadd" result carries potential overflow that has not been removed by an explicit cast to "short". Since the "sadd" result carries potential overflow and since the "idiv" instruction is sensitive to overflow as indicated in Table 2, the instruction type is set to "idiv". Since the "idiv" instruction requires inputs of type "int", both inputs from "sload <b>" and "sadd" are changed to type "int". Forcing a larger type for "sadd" result in turn requires forcing a larger type for its corresponding inputs "sload <a>" and "sconst_2". Conversion continues with the "i2s" instruction 2736 and the "istore <c>" instruction 2740.

Turning now to FIG. 28, a detailed block diagram that illustrates instruction conversion of an arithemetic expression that cannot be optimized to smaller type instructions in accordance with one embodiment of the present invention is presented. FIG. 28 provides more detail for FIG. 27. Sequence 1 (2812) shows the original Java™ bytecode. In sequence 2 (2814), the initial results of conversion render "short"-type instructions. When the divide operation is encountered, an "int"-type divide instruction ("idiv") is generated because one of the inputs ("sadd" result) has potential overflow from a "short"-type value and the divide operation is sensitive to overflow. The "int"-type divide ("idiv") forces each input operand to become type "int". In sequence 2 (2814), this conversion is triggered for the "short"-type addition instruction "sadd", rendering an "int"-type addition instruction ("iadd").

The "int"-type addition instruction ("iadd") forces each input operand to become "int"-type. In sequence 3 (2816), this conversion is triggered for the "short"-type load instruction of variable "a" ("sload <a>"), rendering a conversion instruction from "short"-type to "int"-type ("sload <a>"; "s2i"), resulting in an "int"-type constant instruction (iconst_2).

The "int"-type addition instruction ("iadd") forces each input operand to become "int"-type. In sequence 4 (2818), this conversion is triggered for the "short"-type constant instruction (sconst_2).

The "int"-type divide instruction ("idiv") forces each input operand to become "int"-type. In sequence 5 (2820), this conversion is triggered for the "short"-type load instruction of variable "b" ("sload <b>"), rendering a conversion instruction from "short"- to "int"-type ("sload <b>"; "s2i"). In sequence 6, conversion continues through the end of the code sequence.

To further aid in an understanding of the present invention, the example illustrated in FIG. 28 and discussed above will now be described in more detail, with reference to FIGS. 14–25 and 28. As mentioned above, the initial results of conversion render "short"-type instructions. When the divide operation ("idiv") is encountered, at 1900 the instruction type is set to "short"; the smallest possible instruction type. Next, each operand is checked for potential overflow. Checking the "sadd" result operand proceeds as follows. At 1905, the instruction type of "sdiv" ("short") is not less than the operand type for "sadd" ("short"). At 1915, the "sdiv" instruction type ("short") equals the "sadd" operand type ("short"). At 1920, the "sadd" operand has potential overflow, as indicated in Table 2. At 1925, the "sdiv" instruction is sensitive to overflow, as indicated in Table 1. At 1930, the "sdiv" instruction type ("short") is less than the original instruction type ("int"). Thus, at 1935, the instruction type is set to the next largest type ("int"). The corresponding instruction in this example is "idiv".

Checking the "sload <b>" operand proceeds as follows. At 1905 the "idiv" instruction type ("int") is not less than the operand type ("short"). At 1915 the instruction type ("int") is also not equal to the operand type ("short"), so optimization of the current instruction terminates.

Next, the operand types for the "idiv" instruction are matched at 1630. At 2000, the instruction type for "idiv" is int.

The "idiv" instruction has two operands: the "sadd" result and the "sload <b>" result. Validation of the "sadd" result operand proceeds as follows. At 2015, the "idiv" instruction type ("int") is greater than the operand type ("short"). At 2020 the input instruction ("sload <b>") is obtained. At 2025, the operand type ("short") of the "sadd" result operand is changed to the "idiv" instruction type ("int").

Changing the operand type of the "sadd" result operand proceeds as follows. At 2100, the "sload <b>" instruction does not generate the "sadd" result. At 2020, the input instruction ("sadd") is obtained. At 2025, the operand type ("short") of the input instruction ("sadd") is changed to the instruction type ("int").

Changing the operand type proceeds as follows. The instruction ("sadd") generates the operand ("sadd" result), so at 2105 the instruction type of the "sadd" instruction is changed to the instruction type ("int").

Changing the instruction type proceeds as follows. At 2200 the "sadd" instruction type ("short") is not equal to the desired type ("int"). At 2205 the minimum required type is set to the desired type ("int"). At 2210 the instruction type is set to "int". The corresponding instruction is "iadd", the "int"-based addition instruction that generates an "int"-type result. Sequence 3 (2816) is next in the example illustrated in FIG. 28.

Next, the operand type of each incorrect operand in each input stack is changed to the desired type ("int"). The "sadd" instruction has two input operands: "sload <a>" and sconst_2. Changing the operand type for the "sload <a>" operand proceeds as follows. At 2220, the input instruction is set to "sconst_2". At 2230 the operand type for the "sload <a>" operand is changed to the desired type ("int").

The "change operand type" process proceeds as follows. At 2100, the "sconst_2" instruction does not generate the "sload <a>" result. At 2107, the input instruction of the "sconst_2" instruction ("sload <a>") is obtained. At 2110, the operand type ("short") of the "sload <a>" result operand is changed to the instruction type ("int").

Changing the operand type proceeds as follows. At 2100, the "sload <a>" instruction generates the "sload <a>" result so at 2105 the instruction type of the "sload <a>" instruction is changed to the desired type ("int").

Changing the instruction type proceeds as follows. At 2200 the "sload <a>" instruction type ("short") is not equal to the desired type ("int"), so the minimum required type is set to the desired type ("int") at 2205. At 2210 the instruction type is set to "int". The corresponding instruction sequence is "sload <a>; s2i". Since "sload <a>" has no input operands, the block at 2220 is skipped. At 2235 the results are associated with the ("sload <a>; s2i") instruction sequence.

Changing the operand type for the "sconst_2" operand of the "sadd" instruction proceeds as follows. At 2215, the input instruction is set to "sconst_2". At 2230 the operand type for the "sconst_2" operand is changed to the desired type ("int").

Changing the operand type proceeds as follows. At 2100, the "sconst_2" instruction generates the "sconst_2" result so at 2105 the instruction type of the "sconst_2" instruction is changed to the desired type ("int").

Changing the instruction type proceeds as follows. At 2200 the instruction type ("short") is not equal to the desired type ("int"), so the minimum required type is set to the desired type ("int") at 2205. At 2210 the instruction type is set to "int". The corresponding instruction is "iconst_2". At 2235 the results are associated with the "iconst_2" instruction.

At 2235, the results of changing the instruction type for the "iadd" instruction are stored. Sequence 3 (2816) is next in the example illustrated in FIG. 28.

Validation of the "sload <b>" result operand proceeds as follows. At 2015, the "idiv" instruction type ("int") is greater than the "sload <b>" result operand type ("short"). At 2020, the input instruction ("sload <b>") is obtained. At 2025, the operand type ("short") of the input instruction ("sload <b>") is changed to the "idiv" instruction type ("int").

Changing the "sload <b>" result operand type proceeds as follows. At 2100 the "sload <b>" instruction generates the "sload <b>" result operand, so at 2105 the instruction type of the input instruction ("sload <b>") is changed to "int".

Changing the instruction type proceeds as follows. At 2200 the "sload <b>" instruction type ("short") is not equal to the desired type ("int"), so at 2205 the minimum required type is set to the desired type ("int"). At 2210 the instruction type is set to generate output with an operand equal to the desired type ("int"). In this case, the required output is generated by the instruction sequence ("sload <b>; s2i"). Since "sload <b>" does not have input operands, block 2220 is skipped. Results are recorded at 2235. Sequence 6 (2822) is next in the example illustrated in FIG. 28. Instruction conversion continues with conversion of the "i2s" instruction and ends with the conversion of the "istore <c>" instruction.

A second pass through the code segment will occur because instructions were changed during the first pass, resulting in the "another pass flag" being set at reference numeral 2520 of FIG. 25. During the second pass, all of the instructions that had been set to "int" type will remain that type based on the assignment to "Required minimum type" at reference numeral 1900 of FIG. 19. This completes the example of FIG. 28 resulting in the bytecode of sequence 7 (2824).

Turning now to FIG. 29, a block diagram that illustrates instruction conversion where input stacks do not match in accordance with one embodiment of the present invention is presented. In FIG. 29, "int"-based source instructions 2938 are converted to "short-based instructions beginning with the "iload <x>" instruction 2900. Conversion proceeds up to the "iadd" instruction 2930. The "iadd" instruction 2930 has two input instructions: the "goto L2" instruction 2918 and the "iload <c>" instruction 2926. However, the input stacks associated with the two input instructions do not match. The input stack associated with the "goto L2" instruction 2918 comprises a variable of type "int" ("iload <a>" result) and a variable of type "short" ("sload <b>" result), while the input stack associated with the "iload <c>" instruction 2926 comprises two variables of type "int" ("iload <a>" result and "iload <c>" result). Accordingly, the stacks are made the same by changing the operand type of the "goto L2" instruction 2918 to the "int" type, which in turn changes the operand type of the "sload <b>" instruction 2912 to the "int" type, which in turn changes the instruction type of the "sload <b>" instruction 2912 to the "int" type. The corresponding instruction is "sload <b>; s2i". Conversion continues with the conversion of the "istore <d>" instruction 2934.

Turning now to FIG. 30, a detailed block diagram that illustrates instruction conversion where input stacks do not match in accordance with one embodiment of the present invention is presented. FIG. 30 provides more detail for FIG. 29. Conversion occurs as discussed above up to item 3008 in sequence 2 (3002) of the example. At 1700, input stacks are compared for the "iadd" instruction. At 1800 the stack entries have equivalent types, since types "short" and "int" are both "integer" types. At 1805 an input stack entry has a type that is smaller than other corresponding input stack entries. In particular, entry 3020 from input stack 3010 is of type "short", while corresponding entry 3024 from input stack 3012 is of type "int". At 1810 the operand type for the input instruction ("goto L2" instruction 2918) is changed to the larger type ("int").

Changing the operand type of the input instruction "goto L2" 2918 proceeds as follows. At 2100 the "goto L2" instruction 2918 does not generate the "sload <b>" result, so at 2110 the operand type of the input instruction of the "goto L2" instruction ("sload <b>") is changed to the larger type ("int") and at 2115 the results are associated with the "goto L2" instruction.

Changing the operand type of the input instruction "sload <b>" proceeds as follows. At 2100 the "sload <b>" instruction generates the "sload <b>" result, so at 2105 the operand type of the input instruction ("sload <b>") is changed to the larger type ("int") and at 2115 the results are associated with the "sload <b>" instruction.

Changing the instruction type of the input instruction "sload <b>" proceeds as follows. At 2200 the instruction type ("short") of the input instruction ("sload <b>") is not equal to the larger type ("int"), so at 2205 the minimum required type is set to the larger type ("int"). At 2210 the instruction type is set to "int". The corresponding instruction is "sload <b>; s2i". The block at 2220 is skipped since load instructions do not have input operands. At 2235 the results are associated with the "sload <b>" instruction. Sequence 3 (3004) is next in the example illustrated in FIG. 30. Conversion in sequence 3 (3004) and sequence 4 (3006) proceeds as discussed above.

FIGS. 31 and 32 illustrate conversion of an instruction that has multiple consumers in accordance with one embodiment of the present invention. The Java™ "dup" stack manipulation instruction is one example of an instruction that may have multiple consumers. The "dup_x1" instruction duplicates the top item on the stack and inserts the duplicate below the second-from-top item. Both items must be single-word items. The "dup_x 0x21" instruction duplicates the top two words on the stack and inserts them one word down in the stack. The "dup_x 0x22" instruction duplicates the top two words on the stack and inserts them two words down in the stack.

Turning now to FIG. 31, a block diagram that illustrates conversion of an instruction that has multiple consumers in accordance with one embodiment of the present invention is presented. Instruction conversion proceeds up to the "dup_x1" instruction 3112, converting "int"-based instructions and operands to the smallest usable type ("short") wherever possible. At this point, the top item on the stack is the "sload <b>" result and the second-from-top item is the "sload <a>" result. The "dup_x1" instruction 3112 is converted to a "dup_x11" instruction that duplicates the top word ("sload <b>" result) on the stack and inserts the duplicate one word down in the stack. The "imul" instruction 3116 is converted to an "smul" instruction that pops the top two items from the stack, multiplies them and puts the result on the stack. At this point, the stack comprises two entries. The top entry corresponds to the "smul" result and the bottom entry corresponds to the "sload <b>" result duplicated by the "dup_x1" instruction. The "i2s" instruction is not required because the top item on the stack is already a "short"-type and the "istore <c>" instruction 3124 is converted to a "sstore <c>" instruction that pops the "short"-type "smul" result from the stack and stores it in the variable "c". At this point, the stack comprises only the "sload <b>" result duplicated by the "dup_x1" instruction. The "iload <d>" instruction 3128 cannot be converted to a smaller type because "d" is declared as an "int" type. The "iload <d>" instruction 3128 pushes the "int"-typed "d" value on the top of the stack, leaving the "short"-typed "sload <b>" result at the bottom of the stack. The "iadd" instruction 3132 cannot be optimized to a smaller type because one of its operands ("iload <d>" result) is "int"-typed. However, the other operand ("sload <b> result") is a "short" type, so the operand generation chain is followed recursively until the instruction that generates the smaller-typed operand ("sload <b>" result duplicated by "dup_x") is located. The instruction type of the instruction that generates the smaller-typed operand is changed to generate the larger-typed operand. The first instruction conversion pass concludes with the "istore <d>" instruction 3136. Because the "iadd <d>" result operand could not be optimized to a smaller type, the "istore <d>" instruction 3136 cannot be optimized to a smaller type.

The second instruction conversion pass begins with the "sload <a>" instruction and proceeds to the "imul" instruction. At this point, the "dup_x 0x21"-based "sload <a>" result on the stack is type "short" and the "imul" instruction requires type "int". This forces changing the instruction type to "dup_x 0x22" so that it will produce an "int" value for the "sload <a>" result. The "dup_x 0x22" instruction requires two int-typed variables and the "sload <a>" result is a "short" type, so the "sload <a>" instruction is forced to an "int" type by using the "s2i" instruction to force the "sload "<a>" result to an "int" type. Instruction conversion then proceeds to the "sstore <c>" instruction. At this point, an "int"-typed value ("imul" result) is on the stack. The operand is forced to a "short" type using the "i2s" instruction.

Turning now to FIG. 32, a detailed block diagram that illustrates conversion of an instruction that has multiple consumers in accordance with one embodiment of the present invention is presented. FIG. 32 provides more detail for FIG. 31. Instruction conversion proceeds up to the "iadd" instruction 3216. At this point, the stack comprises two entries. One entry corresponds to an "int"-typed "iload <d>" 3218 result. The other entry corresponds to a "short"-typed copy of the "sload <b>" result that remains from the "dup_x11" 3224 result. At 1615, validation of the input stacks is successful. At 1625, the "iadd" instruction is optimized. At 1900, the instruction type is set to the smallest useable type ("short"). The corresponding instruction is "sadd". The "dup_x11"-based "sload <b>" result and "iload <d>" 3218 result operands are checked at 1945. With regard to the "dup_x11"-based "sload <b>" result operand, at 1905 the instruction type ("short") is not less than the "dup_x11"-based "sload <b>" result operand type ("short"), at 1915 the "sadd" instruction type ("short") equals the "dup_x11"-based "sload <b>" result operand type ("short") and at 1920 the "dup_x11"-based "sload <b>" result operand does not have potential overflow. With regard to the "iload <d>" 3218 result operand, at 1905 the "sadd" instruction type ("short") is less than the "iload <d>" operand type ("int"), at 1910 the instruction type is set to the "iadd" operand type ("int"), at 1915 the instruction type ("int") equals the "iload <d>" operand type ("int"), at 1920 the "iload <d>" operand does not have potential overflow.

Referring again to FIG. 16, at 1630 the operand types are matched. At 2000 the "iadd" instruction type is "int". The "dup_x11"-based "sload <b>" result operand and "iload <d>" 3218 result operand are checked at 2010. Regarding the "iload <d>" 3218 result, at 2015 the instruction type ("iadd") is not greater than the "iload <d>" 3218 result, completing validation of the "iload <d>" 3218 result. Regarding the "dup_x11"-based "sload <b>" result operand, at 2015 the "iadd" instruction type ("int") is greater than the "dup_x11"-based "sload <b>" result operand type ("short"), so at 2020 the input instruction "iload <d>" is obtained. At 2025 the "change operand type" process is invoked to change the "dup_x11" instruction to generate an "int" type for the "sload <b>" result. At 2100 the "iload <d>" instruction does not generate the "dup_x11"-based "sload <b>" result operand, so the same check is performed on the input instruction ("sstore") of the "iload <d>" instruction. At 2100 the "sstore" instruction does not generate the "dup_x11"-based "sload <b>" result operand, so the same check is performed on the input instruction ("smul") of the "sstore" instruction. At 2100 the "smul" instruction does not generate the "dup_x11"-based "sload <b>" result operand, so the same check is performed on the input instruction ("dup_x 0x11") of the "smul" instruction. At 2100 the "dup_x 0x11" instruction generates the "dup_x11"-based "sload <b>" result operand, so at 2105 the instruction type of the "dup_x 0x11" instruction is changed to the desired type, which is the "iadd" instruction type ("int").

Changing the instruction type is illustrated in FIG. 22. At 2200 the "dup_x 0x11" instruction type ("short") does not equal the desired type ("int"). Thus, at 2205 the minimum required type is set to the desired type ("int"). At 2210 the instruction is set to generate output of the desired type. In this particular example, the "dup_x 0x21" instruction outputs an "int" type, so the instruction is set to "dup_x0x21".

This completes sequence 3 (3204) in the example illustrated in FIG. 32. At 2215, the input instruction ("sload <b>") is determined. The "sload <b>" result type ("short") is incorrect because it does not equal the "int" type, so at 2230 the input instruction ("sload <b>") is checked to determine whether it generates the incorrect operand ("sload <b>" result). At 2100 the "sload <b>" instruction generates the "sload <b>" result so at 2105 the "sload <b>" instruction type is changed to the desired type ("int"). At 2200 the "sload <b>" instruction type does not equal the desired type "int", so at 2205 the required minimum type is set to the desired type ("int"). At 2210 the instruction is set to generate output of the desired type ("int"). In this particular example, the instruction sequence "sload <b>; s2i" outputs an "int" value. At 2235 the results are associated with the "dup_x 0x21" instruction.

Referring again to FIG. 16, after validating the operand types for the "iadd" instruction, the conversion results are recorded at 1635. Recording conversion results comprises determining potential overflow and generating an output stack. At 2405, the "iadd" instruction type ("int") equals the original instruction type ("int"), so there is no potential overflow. This completes sequence 4 (3206) in the example illustrated in FIG. 32.

In sequence 5 (3208) of FIG. 32, the second instruction conversion pass begins with the "sload <a>" instruction (converted from the original "iload <a>" instruction) and proceeds to the "smul" instruction (converted from the original "imul" instruction). A stack manipulation instruction ("dup_x 0x21") precedes the "smul" instruction. In operation, the "dup_x 0x21" instruction makes a copy of the top "int" value on the stack and places it one position down in the stack. At this point, the stack comprises three entries. The top and bottom stack entries correspond to a "dup_x 0x21"-based "sload <b>; s2i" result of type "int". The middle stack entry corresponds to a "dup_x 0x21"-based "sload <a>" result of type "short". At 1615, validation of the input stacks is successful. At 1625, the "smul" instruction is optimized. At 1900, the instruction type is set to the smallest usable type ("short"). The top two stack entries are operands for the "smul" instruction. With regard to the operand corresponding to the "dup_0x21"-based "sload <b>; s2i"result, at 1905 the "smul" instruction type ("short") is less than the "dup_x21"-based "sload <b>; s2i " operand type ("int"). At 1910, the instruction type is set to the "dup_x21"-based "sload <b>; s2i" operand type ("int"). At 1915, the "imul" instruction type ("int") equals the "dup_x21"-based "sload <b>; s2i" operand type ("int"). At 1920, the "dup_x21"-based "sload <b>; s2i" result operand does not have potential overflow. Sequence 5 (3208) is next in the example illustrated in FIG. 32.

With regard to the "dup_x 0x21"-based "sload <a>" result operand, at 1905 the "imul" instruction type ("int") is not less than the "dup_x 0x21"-based "sload <a>" result operand type ("short") and at 1915 the "imul" instruction type ("int") does not equal the "sload <a>" operand type ("short").

Referring again to FIG. 16, at 1630 the operand types are matched. At 2000 the "imul" instruction type is "int". With regard to the "dup_x21"-based "sload <b>; s2i" result operand, at 2015 the instruction type ("int") is not greater than the "dup_x11"-based "sload <b>; s2i" operand type ("int"). With regard to the "dup_x21"-based "sload <a>" result operand, at 2015 the instruction type "int" is greater than the "sload <a>" result operand type ("short"), so at 2025 the input instruction ("dup_x 0x21") is checked to determine whether it generates the "sload <a>" result. At 2100 the "dup_x 0x21" instruction generates the "sload <a>" result, so at 2105 the instruction type of the "dup_x 0x21" instruction is changed to the desired type, which is the "imul" instruction type ("int").

Changing the instruction type is illustrated in FIG. 22. At 2200 the "dup_x 0x21"-based "sload <a>" instruction type ("short") does not equal the desired type ("int"). Thus, at 2205 the minimum required type is set to the desired type ("int"). At 2210 the instruction is set to generate output of the desired type. In this particular example, the "dup_x 0x22" instruction outputs an "int" type, so the instruction is set to "dup_x 0x22". Sequence 6 (3210) is next step in the example illustrated in FIG. 32.

At 2215, the input instruction ("sload <b>") is obtained. Block 2225 is performed per incorrect operand. The "sload <a>" result operand is incorrect because the "sload <a>" result type ("short") does not equal the "int" type, so at 2230 the input instruction ("sload <b>") is checked to determine whether it generates the incorrect operand ("sload <a>" result). At 2100 the "sload <b>" instruction does not generate the "sload <a>" result, so the same check is performed on the input instruction ("sload <a>") of the "sload <b>" instruction. At 2100 the "sload <a>" instruction generates the "sload <a>" result, so at 2105 the instruction type of the "sload <a>" instruction is changed to the desired type, which is the "int" type.

Changing the instruction type is illustrated in FIG. 22. At 2200 the "sload <a>" instruction type ("short") does not equal the desired type ("int"). Thus, at 2205 the minimum required type is set to the desired type ("int"). At 2210 the instruction type is set to generate output of the desired type. In this particular example, the instruction sequence "sload <a>; s2i" outputs an "int" type, so the instruction is set to "sload <a>; s2i". At 2235 the results are associated with the "sload <a>; s2i" instruction.

Instruction conversion continues with conversion of the "sstore <c>" instruction. At 1615, validation of the input stacks is successful. At 1625, the "sstore <c>" instruction is optimized. At 1900, the instruction type is set to the smallest useable type ("short"). At this point, the top element of the stack is the "imul" result, an "int"-typed value. With regard to the "imul" result operand, the "sstore <c>" instruction type ("short") is less than the "imul" result operand type ("int") so at 1910 the instruction type is set to the "imul" result operand type ("int"). The corresponding instruction in this case is the "i2s; sstore <c>" instruction. At 1915, the "i2s; sstore <c>" instruction type ("short") equals the "imul" result operand type. At 1920 the "imul" result does not have potential overflow. Conversion continues as discussed above.

Although embodiments of the present invention have been described with regard to integral types, those of ordinary skill in the art will recognize that the invention may be applied to floating-point arithmetic expressions as well, given a computer language that supports casting a large floating point type to a smaller floating point type and a source processor that supports both floating point types. Furthermore, although embodiments of the present invention have been illustrated with respect to Java Card™ technology, those of ordinary skill in the art will recognize that the invention is applicable to many other platforms. These platforms include, by way of example, K virtual machine (KVM) technology. KVM technology is described in "The K Virtual Machine (KVM)—A White Paper", Jun. 8, 1999, Sun Microsystems, Inc.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for arithmetic expression optimization, comprising:

receiving a first instruction defined for a first processor having a first base, said instruction comprising an operator and at least one operand having an operand type;

converting said first instruction to a second instruction optimized for a second processor having a second base when overflow is not possible based at least in part on said operator and the relationship between said operand type and said second base, said second base smaller than said first base; and converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base.

2. The method of claim 1 wherein said first instruction is arithmetic.

3. The method of claim 1 wherein said first instruction comprises a non-arithmetic, type-sensitive instruction.

4. The method of claim 1, further comprising repeating said receiving, said converting a first instruction and said converting instructions in a chain of instructions for instructions that comprise a program.

5. The method of claim 1, further comprising linking each instruction to input instructions in all control paths.

6. The method of claim 1 wherein said first instruction is defined for a first processor having a first base; and said second instruction is defined for a second processor having a second base.

7. The method of claim 6 wherein
said first processor comprises a Java™ Virtual Machine; and
said second processor comprises a Java Card™ Virtual Machine.

8. The method of claim 6 wherein
said first processor comprises a 32-bit processor; and
said second processor comprises a resource-constrained 16-bit processor.

9. The method of claim 1 wherein
said third instruction is not a source instruction; and
said converting instructions in a chain of instructions further comprises:
recursively examining input instructions until said third instruction is obtained; and
setting the type of said third instruction to equal said second type.

10. The method of claim 1 wherein
said third instruction comprises a source instruction; and
said converting instructions in a chain of instructions further comprises:
recursively examining input instructions until said third instruction is obtained;
setting the type of said third instruction to equal said second type; and repeating said changing for each input instruction of said third instruction.

11. The method of claim 1, further comprising recording conversion results, said recording comprising:
    determining potential overflow associated with said second instruction; and
    generating an output stack based at least in part on execution of said second instruction.

12. The method of claim 11 wherein said determining further comprises:
    indicating said second instruction has potential overflow if said second type does not equal said first type, if said second instruction does not remove potential overflow, and if overflow is possible based at least in part on the type of said second instruction and the relationship between said first type and said second type; and
    indicating said second instruction has potential overflow if said second type does not equal said first type, if said second instruction does not remove potential overflow, if overflow is not possible based at least in part on the type of said second instruction and the relationship between said first type and said second type, if said second instruction propagates potential overflow, and if at least one operand in said at least one input stack has potential overflow.

13. The method of claim 11 wherein said generating further comprises:
    creating a new output stack based at least in part on one of said at least one input stack;
    updating said new output stack based at least in part on operation of said second instruction; and
    indicating another instruction conversion pass is required if said new stack does not equal a previous output stack.

14. A method for arithmetic expression optimization, comprising:
    step for receiving a first instruction defined for a first processor having a first base, said instruction comprising an operator and at least one operand having an operand type;
    step for converting said first instruction to a second instruction optimized for a second processor having a second base when overflow is not possible based at least in part on said operator and the relationship between said operand type and said second base, said second base smaller than said first base; and
    step for converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base.

15. The method of claim 14 wherein said first instruction is arithmetic.

16. The method of claim 14 wherein said first instruction comprises a non-arithmetic, type-sensitive instruction.

17. The method of claim 14, further comprising step for repeating said receiving, said converting a first instruction and said converting instructions in a chain of instructions for instructions that comprise a program.

18. The method of claim 14, further comprising step for linking each instruction to input instructions in all control paths.

19. The method of claim 14 wherein said first instruction is defined for a first processor having a first base; and said second instruction is defined for a second processor having a second base.

20. The method of claim 19 wherein
    said first processor comprises a Java™ Virtual Machine; and
    said second processor comprises a Java Card™ Virtual Machine.

21. The method of claim 19 wherein
    said first processor comprises a 32-bit processor; and
    said second processor comprises a resource-constrained 16-bit processor.

22. The method of claim 14 wherein
    said third instruction is not a source instruction; and
    said step for converting instructions in a chain of instructions further comprises:
        step for recursively examining input instructions until said third instruction is obtained; and
        step for setting the type of said third instruction to equal said second type.

23. The method of claim 14 wherein
    said third instruction comprises a source instruction; and
    said step for converting instructions in a chain of instructions further comprises:
        step for recursively examining input instructions until said third instruction is obtained;
        step for setting the type of said third instruction to equal said second type; and
        step for repeating said changing for each input instruction of said third instruction.

24. The method of claim 14, further comprising step for recording conversion results, said recording comprising:
    step for determining potential overflow associated with said second instruction; and
    step for generating an output stack based at least in part on execution of said second instruction.

25. The method of claim 24 wherein said step for determining further comprises:
    step for indicating said second instruction has potential overflow if said second type does not equal said first type, if said second instruction does not remove potential overflow, and if overflow is possible based at least in part on the type of said second instruction and the relationship between said first type and said second type; and
    step for indicating said second instruction has potential overflow if said second type does not equal said first type, if said second instruction does not remove potential overflow, if overflow is not possible based at least in part on the type of said second instruction and the relationship between said first type and said second type, if said second instruction propagates potential overflow, and if at least one operand in said at least one input stack has potential overflow.

26. The method of claim 24 wherein said step for generating further comprises:
    step for creating a new output stack based at least in part on one of said at least one input stack;
    step for updating said new output stack based at least in part on operation of said second instruction; and
    step for indicating another instruction conversion pass is required if said new stack does not equal a previous output stack.

27. A program storage device readable by a machine, embodying a program of instructions executable by the machine to perform a method for arithmetic expression optimization, the method comprising:

receiving a first instruction defined for a first processor having a first base, said instruction comprising an operator and at least one operand having an operand type;

converting said first instruction to a second instruction optimized for a second processor having a second base when overflow is not possible based at least in part on said operator and the relationship between said operand type and said second base, said second base smaller than said first base; and converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base.

28. The program storage device of claim 27 wherein said first instruction is arithmetic.

29. The program storage device of claim 27 wherein said first instruction comprises a non-arithmetic, type-sensitive instruction.

30. The program storage device of claim 27, said method further comprising repeating said receiving, said converting a first instruction and said converting instructions in a chain of instructions for instructions that comprise a program.

31. The program storage device of claim 27, said method further comprising linking each instruction to input instructions in all control paths.

32. The program storage device of claim 27 wherein said first instruction is defined for a first processor having a first base; and said second instruction is defined for a second processor having a second base.

33. The program storage device of claim 32 wherein
said first processor comprises a Java™ Virtual Machine; and
said second processor comprises a Java Card™ Virtual Machine.

34. The program storage device of claim 32 wherein
said first processor comprises a 32-bit processor; and
said second processor comprises a resource-constrained 16-bit processor.

35. The program storage device of claim 27 wherein
said third instruction is not a source instruction; and
said converting instructions in a chain of instructions further comprises:
recursively examining input instructions until said third instruction is obtained; and
setting the type of said third instruction to equal said second type.

36. The program storage device of claim 27 wherein
said third instruction comprises a source instruction; and
said converting instructions in a chain of instructions further comprises:
recursively examining input instructions until said third instruction is obtained;
setting the type of said third instruction to equal said second type; and
repeating said changing for each input instruction of said third instruction.

37. The program storage device of claim 27, said method further comprising recording conversion results, said recording comprising:

determining potential overflow associated with said second instruction; and generating an output stack based at least in part on execution of said second instruction.

38. The program storage device of claim 37 wherein said determining further comprises:

indicating said second instruction has potential overflow if said second type does not equal said first type, if said second instruction does not remove potential overflow, and if overflow is possible based at least in part on the type of said second instruction and the relationship between said first type and said second type; and indicating said second instruction has potential overflow if said second type does not equal said first type, if said second instruction does not remove potential overflow, if overflow is not possible based at least in part on the type of said second instruction and the relationship between said first type and said second type, if said second instruction propagates potential overflow, and if at least one operand in said at least one input stack has potential overflow.

39. The program storage device of claim 37 wherein said generating further comprises:

creating a new output stack based at least in part on one of said at least one input stack;

updating said new output stack based at least in part on operation of said second instruction; and indicating another instruction conversion pass is required if said new stack does not equal a previous output stack.

40. An apparatus for arithmetic expression optimization, comprising:

means for receiving a first instruction defined for a first processor having a first base, said instruction comprising an operator and at least one operand having an operand type;

means for converting said first instruction to a second instruction optimized for a second processor having a second base when overflow is not possible based at least in part on said operator and the relationship between said operand type and said second base, said second base smaller than said first base; and means for converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base.

41. The apparatus of claim 40 wherein said first instruction is arithmetic.

42. The apparatus of claim 40 wherein said first instruction comprises a non-arithmetic, type-sensitive instruction.

43. The apparatus of claim 40, further comprising means for repeating said receiving, said converting a first instruction and said converting instructions in a chain of instructions for instructions that comprise a program.

44. The apparatus of claim 40, further comprising means for linking each instruction to input instructions in all control paths.

45. The apparatus of claim 40 wherein said first instruction is defined for a first processor having a first base; and said second instruction is defined for a second processor having a second base.

46. The apparatus of claim 45 wherein
said first processor comprises a Java™ Virtual Machine; and
said second processor comprises a Java Card™ Virtual Machine.

47. The apparatus of claim 45 wherein
said first processor comprises a 32-bit processor; and
said second processor comprises a resource-constrained 16-bit processor.

48. The apparatus of claim 40 wherein
said third instruction is not a source instruction; and
said means for converting instructions in a chain of instructions further comprises:
means for recursively examining input instructions until said third instruction is obtained; and
means for setting the type of said third instruction to equal said second type.

49. The apparatus of claim 40 wherein
said third instruction comprises a source instruction; and
said means for converting instructions in a chain of instructions further comprises:
means for recursively examining input instructions until said third instruction is obtained;
means for setting the type of said third instruction to equal said second type; and
means for repeating said changing for each input instruction of said third instruction.

50. The apparatus of claim 40, further comprising means for recording conversion results, said recording comprising:
means for determining potential overflow associated with said second instruction; and
means for generating an output stack based at least in part on execution of said second instruction.

51. The apparatus of claim 50 wherein said means for determining further comprises:
means for indicating said second instruction has potential overflow if said second type does not equal said first type, if said second instruction does not remove potential overflow, and if overflow is possible based at least in part on the type of said second instruction and the relationship between said first type and said second type; and
means for indicating said second instruction has potential overflow if said second type does not equal said first type, if said second instruction does not remove potential overflow, if overflow is not possible based at least in part on the type of said second instruction and the relationship between said first type and said second type, if said second instruction propagates potential overflow, and if at least one operand in said at least one input stack has potential overflow.

52. The apparatus of claim 50 wherein said means for generating further comprises:
means for creating a new output stack based at least in part on one of said at least one input stack;
means for updating said new output stack based at least in part on operation of said second instruction; and
means for indicating another instruction conversion pass is required if said new stack does not equal a previous output stack.

53. A method of using an application software program including arithmetic expression optimization of at least one instruction targeted to a processor, the method comprising:
receiving the software program on said processor, said software program optimized according to a method comprising:
receiving a first instruction defined for a first processor having a first base, said instruction comprising an operator and at least one operand having an operand type;
converting said first instruction to a second instruction optimized for a second processor having a second base when overflow is not possible based at least in part on said operator and the relationship between said operand type and said second base, said second base smaller than said first base; and
converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base; and
executing said at least one instruction on said processor.

54. A smart card having a microcontroller embedded therein, said microcontroller configured to execute a virtual machine, the virtual machine capable of executing a software application comprising a plurality of previously optimized instructions, the instructions optimized by a method comprising:
receiving the software program on said processor, said software program optimized according to a method comprising:
receiving a first instruction defined for a first processor having a first base, said instruction comprising an operator and at least one operand having an operand type;
converting said first instruction to a second instruction optimized for a second processor having a second base when overflow is not possible based at least in part on said operator and the relationship between said operand type and said second base, said second base smaller than said first base; and
converting instructions in a chain of instructions to a wider base when said at least one operand carries the potential for overflow beyond said second base and when said operator is sensitive to overflow, said chain bounded by said second instruction and a third instruction that is the source of potential overflow associated with said at least one operand, said third instruction having been previously optimized, said wider base larger than said second base and smaller or equal to said first base.

* * * * *